(12) United States Patent
Morinaga

(10) Patent No.: US 10,871,670 B2
(45) Date of Patent: Dec. 22, 2020

(54) DISPLAY DEVICE WITH POSITION INPUT FUNCTION

(71) Applicant: Sharp Kabushiki Kaisha, Sakai (JP)

(72) Inventor: Junichi Morinaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/483,770

(22) PCT Filed: Feb. 8, 2018

(86) PCT No.: PCT/JP2018/004307
§ 371 (c)(1),
(2) Date: Aug. 6, 2019

(87) PCT Pub. No.: WO2018/150988
PCT Pub. Date: Aug. 23, 2018

(65) Prior Publication Data
US 2019/0391430 A1    Dec. 26, 2019

(30) Foreign Application Priority Data

Feb. 15, 2017  (JP) .................................. 2017-025699

(51) Int. Cl.
*G02F 1/1333* (2006.01)
*G06F 3/044* (2006.01)
(Continued)

(52) U.S. Cl.
CPC ........ *G02F 1/13338* (2013.01); *G02F 1/1368* (2013.01); *G02F 1/133512* (2013.01);
(Continued)

(58) Field of Classification Search
None
See application file for complete search history.

(56) References Cited

U.S. PATENT DOCUMENTS

| 2016/0041665 A1 | 2/2016 | Gwon et al. |
| 2016/0216802 A1 | 7/2016 | Bao et al. |
| 2017/0115784 A1* | 4/2017 | Li ....................... G02F 1/13439 |

FOREIGN PATENT DOCUMENTS

| CN | 105159520 A | 12/2015 |
| JP | 2016-038594 A | 3/2016 |

OTHER PUBLICATIONS

Official Communication issued in International Patent Application No. PCT/JP2018/004307, dated Apr. 24, 2018.

* cited by examiner

*Primary Examiner* — Christopher J Kohlman
(74) *Attorney, Agent, or Firm* — Keating & Bennett, LLP

(57) ABSTRACT

A display device with a position input function includes a pixel electrode, a common electrode, position detection electrodes, position detection lines, and a light blocking portion. The position detection electrodes are configured so that a position input member and corresponding one of the position detection electrodes form a capacitor. The position detection lines are disposed not to overlap the pixel electrode with the insulating film disposed therebetween and selectively connected to the position detection electrodes via contact holes in the insulating film. The light blocking portion is disposed to overlap the pixel electrode and including a pixel opening. The common electrode includes openings overlapping the position detection lines and including first opening edges closer to the pixel electrode and second opening edges on an opposite side from the pixel electrode. The first opening edges are closer to the position detection lines in comparison to the second opening edges.

19 Claims, 13 Drawing Sheets

(51) Int. Cl.
  *G02F 1/1335* (2006.01)
  *G02F 1/1343* (2006.01)
  *G02F 1/1362* (2006.01)
  *G02F 1/1368* (2006.01)
(52) U.S. Cl.
  CPC .. *G02F 1/134309* (2013.01); *G02F 1/136286* (2013.01); *G06F 3/0446* (2019.05); *G02F 2201/40* (2013.01)

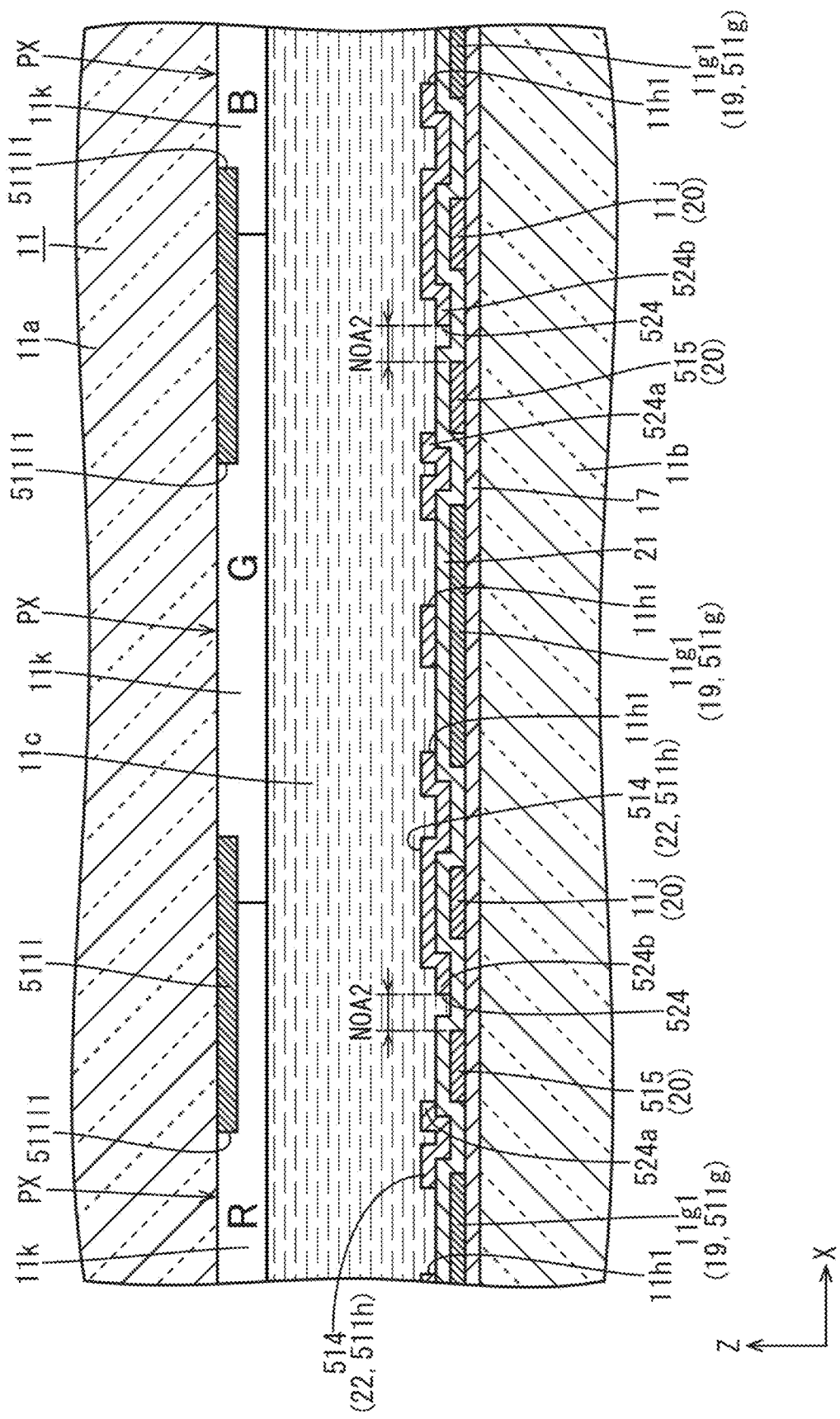

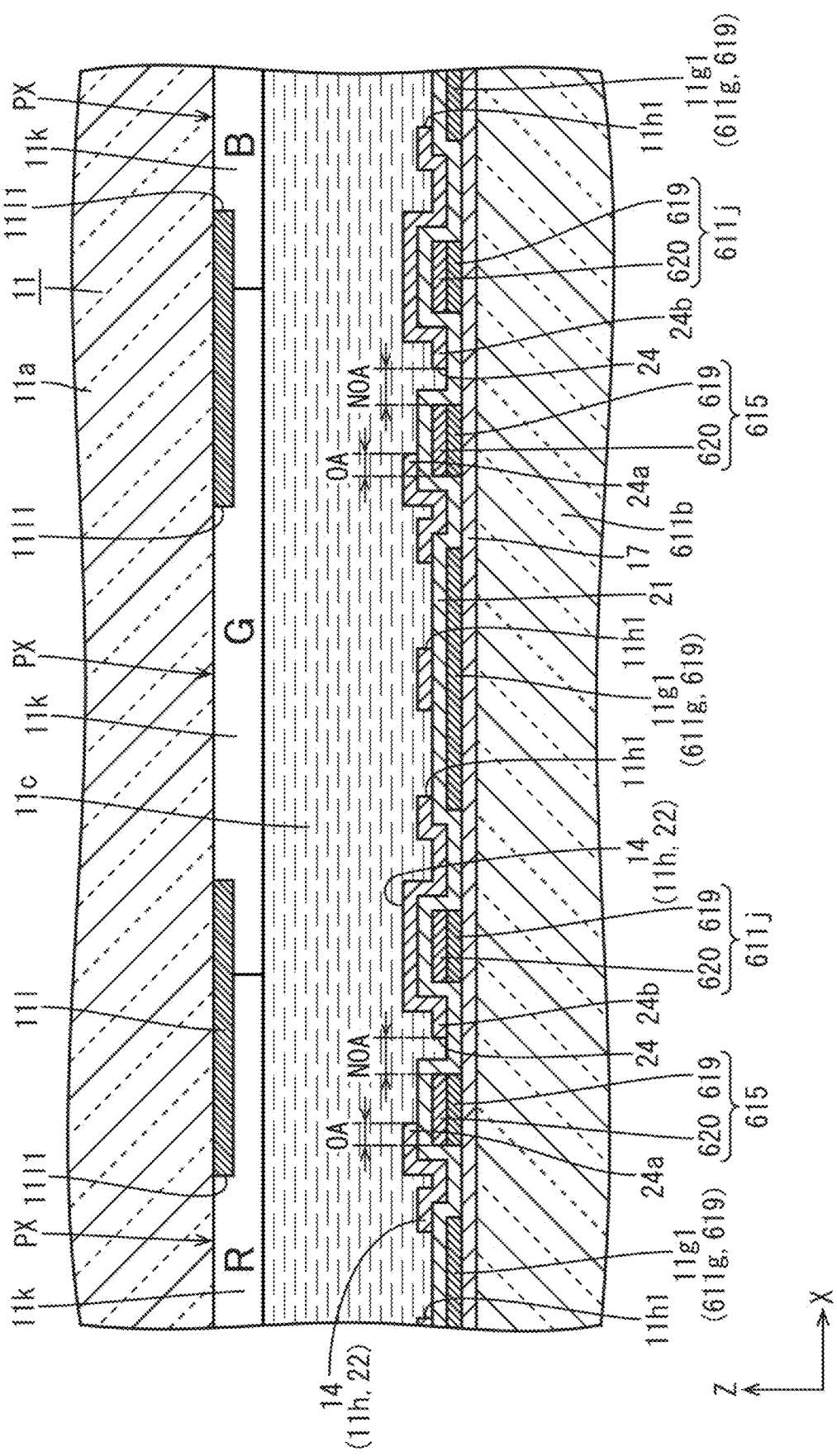

DISPLAY DEVICE WITH POSITION INPUT FUNCTION

TECHNICAL FIELD

The present invention relates to a display device with a position input function.

BACKGROUND ART

One example of a liquid crystal display device including an in-cell touch panel is described in Patent Document 1. The liquid crystal display device in Patent Document 1 includes self-capacitance type touch electrodes and touch lines connected to the touch electrodes via first via openings. Second via openings are provided at positions at which the touch electrodes that are not connected among the touch electrodes overlap the first via openings.

RELATED ART DOCUMENT

Patent Document

Patent Document 1: Specification of US Unexamined Patent Application Publication No. 2016/0216802

Problem to be Solved by the Invention

In the liquid crystal display device described in Patent Document 1, occurrence of failure such as a leakage from any one of the touch electrodes to the touch line to which the touch electrode is not connected through the second via openings is reduced. If the touch line and the touch electrode that is not connected to the touch line are disposed to overlap each other, a parasitic capacitance appears between the touch line and the touch electrode. This may cause a reduction in touch sensitivity. If an overlapping area between the touch line and the touch electrode that is not connected to the touch line is reduced to improve the touch sensitivity, a leakage of light is more likely to occur. To reduce the leakage of light, an aperture ratio may decrease.

DISCLOSURE OF THE PRESENT INVENTION

The present invention was made in view of the above circumstances. An object is to maintain an aperture ratio.

Means for Solving the Problem

A display device with a position input function according to the present invention includes at least one pixel electrode, a common electrode, position detection electrodes, position detection lines, and a light blocking portion. The common electrode is disposed to at least partially overlap the at least one pixel electrode via an insulating film. The position detection electrodes are prepared by dividing the common electrode and configured so that a position input member for position input operation and corresponding one of the position detection electrodes form a capacitor to detect a position of input by the position input member. The position detection lines are disposed not to overlap the at least one pixel electrode such that at least the insulating film is disposed between the common electrode and the position detection lines and selectively connected to the position detection electrodes via contact holes formed at least in the insulating film. The light blocking portion is disposed to overlap at least a section of the at least one pixel electrode and includes a pixel opening. The light blocking portion blocks light. The common electrode includes openings overlapping at least sections of the position detection lines and including opening edges. The opening edges include first opening edges located closer to the at least one pixel electrode relative to the position detection lines and second opening edges located on an opposite side from the at least one pixel electrode relative to the position detection lines. The first opening edges are closer to the position detection lines in comparison to the second opening edges.

According to the configuration, a potential difference may be created between the at least one pixel electrode and the common electrode, at least a section of which overlaps the at least one pixel electrode via the insulating film, based on a voltage applied to the at least one pixel electrode. Image display is performed using the potential difference. The image display is performed through transmission of light through the pixel opening overlapping at least the section of the at least one pixel electrode. The position detection lines disposed such that the insulating film is disposed between the position detection lines and the common electrode are selectively connected to the position detection electrodes prepared by dividing the common electrode via the contact holes. The position detection electrodes are for detecting a position of input by the position input member using a signal supplied through the position detection line based on a capacitance between any one of the position detection electrodes and the position input member that is for position input operation. Because the position detection lines are disposed not to overlap the at least one pixel electrode, the aperture ratio is less likely to be reduced and display quality is less likely to be reduced due to a parasitic capacitance between the at least one pixel electrode and the position detection lines.

The common electrode includes the openings overlapping at least the sections of the position detection lines. Therefore, a parasitic capacitance between any one of the position detection lines and the position detection electrode that is not connected to the position detection line can be reduced. According to the configuration, proper sensitivity can be achieved in the position detection. If a gap is provided between the opening edge of each opening in the common electrode and corresponding one of the position detection lines in a plan view, a leakage of light is created around the gap due to the an electric field created at the opening edge facing the gap. This may reduce the display quality. To reduce the leakage of light, areas of the light blocking portion may be increased. However, the pixel opening may be reduced in size and thus the aperture ratio may be reduced. In the common electrode, the first opening edge of the opening edges of the opening closer to the at least one pixel electrode relative to the position detection lines is disposed closer to the position detection lines in comparison to the second opening edge on the opposite side from the at least one pixel electrode relative to the position detection lines. Therefore, the leakage of light is less likely to occur on a pixel electrode side relative to the position detection lines. Expansion of the areas of the light blocking portion on the pixel electrode side relative to the position detection lines is not required and thus the pixel opening can be provided in a proper side. Therefore, the aperture ratio is less likely to be reduced.

The following configurations are preferable embodiments of the present invention.

(1) The second opening edges of the openings in the common electrode may not overlap the position detection lines and the first opening edges overlap section of the position detection lines. Gaps may not be provided between the position detection lines and the first opening edges in a plan view. Therefore, light toward the first opening edges are blocked by the position detection lines. Without the light blocking portion, the leakages of light on the pixel electrode side relative to the position detection lines may be further properly reduced. Therefore, the pixel opening can be provided in a larger size in the light blocking portion. This configuration is preferable for reducing the aperture ratio.

(2) The first opening edges and the second opening edges of the openings in the common electrode may not overlap the position detection lines. Non-overlapping areas between the first opening edges and the position detection lines may be smaller than non-overlapping areas between the second opening edges and the position detection lines. According to the configuration, a parasitic capacitance that may appear between any one of the position detection lines and the position detection electrode that is not connected to the position detection line is reduced. Therefore, more proper sensitivity can be achieved in the position detection. Even if a gap is provided between the first opening edge of each opening in the common electrode and the corresponding position detection line, the gap is smaller than a gap between the second opening edge of the opening and the corresponding position detection line. Therefore, the leakages of light on the pixel electrode side relative to the position detection line are further less likely to occur.

(3) The first opening edges of the openings in the common electrode may be flush with ends of the position detection lines on a pixel electrode side. According to the configuration, a parasitic capacitance that may appear between any one of the position detection lines and the position detection electrode that is not connected to the position detection line can be properly reduced. Furthermore, a gap is less likely to be provided between the first opening edge of each opening in the common electrode and the corresponding position detection line in the plan view. Therefore, the leakages of light are further less likely to occur on the pixel electrode side relative to the position detection lines without the light blocking portion. According to the configuration, the pixel opening can be provided in the proper size in the light blocking portion and the aperture ratio is further less likely to be reduced while the proper sensitivity is maintained in the position detection.

(4) The position detection lines and the at least one pixel electrode may be disposed in the same layer. Between the position detection lines and the common electrode, the insulating film that is disposed between the at least one pixel electrode and the common electrode is disposed. In comparison to a configuration in which position detection lines are disposed on opposite side from a common electrode relative to a pixel electrode via a second insulating film, the production cost can be reduced by the cost of the second insulating film because the second insulating film is not required.

(5) The position detection lines may be disposed on an opposite side from the common electrode relative to the at least one pixel electrode via a second insulating film and selectively connected to the position detection lines via the contact holes in the insulating film and the second insulating film. According to the configuration, the insulating film and the second insulating film are disposed between the common electrode and the position detection lines. Therefore, a parasitic capacitance between any one of the position detection lines and the position detection electrode that is not connected to the position detection line is further reduced and thus more proper sensitivity can be achieved in the position detection.

(6) At least one signal line for transmitting a signal supplied to the at least one pixel electrode may be provided. The at least one signal line may be disposed in the layer in which the position detection lines may be disposed and separated from the position detection lines. In comparison to a configuration in which the at least one signal line is disposed on an opposite side from the common electrode relative to the position detection lines to overlap the position detection lines via a second insulating film, the production cost can be reduced by the cost of the second insulating film because the second insulating film is not required.

(7) The at least one pixel electrode may include pixel electrodes and the at least one signal line may include signal lines. Any one of the signal lines may be separated from corresponding one of the position detection lines closer to corresponding one of the pixel electrodes to which the any one of the signal lines is connected. According to the configuration, the any one of the signal lines is disposed such that corresponding one of the position detection lines is disposed between the any one of the signal lines and the pixel electrode that is not connected to the any one of the signal lines. Therefore, the pixel electrode is shielded from the electric field created by the signal line by the position detection line. According to the configuration, occurrence of crosstalk can be reduced and thus a proper level of display quality can be achieved.

(8) At least one signal line may be provided for transmitting a signal supplied to the at least one pixel electrode. The at least one signal line may be disposed to overlap the position detection lines via a second insulating film. In comparison to a configuration in which at least one signal line and position detection lines are disposed in the same layer and gaps are provided between the at least one signal line and the position detection lines, the at least one signal line and the position detection lines can be efficiently arranged. Therefore, the aperture ratio is less likely to be reduced.

(9) The position detection lines and the at least one pixel electrode may be disposed in the same layer. The at least one signal line may be disposed on an opposite side from the common electrode relative to the position detection lines and the at least one pixel electrode via the second insulating film. When a signal is transmitted through the at least one signal line, an electric field may be created between the signal line and the opening edge of the opening in the common electrode. The electric field may induce a leakage of light around the opening. Because the insulating film and the second insulating film are disposed between the common electrode and the signal line, an electric field that may be created between the signal line and the common electrode is reduced. Therefore, a leakage of light is less likely to occur around the opening due to the signal line.

(10) An array substrate including at least the common electrode, the at least one pixel electrode, and the position detection lines may be provided. Furthermore, a common substrate opposed to the array substrate with a gap an including at least a light blocking portion may be provided. For placing the array substrate and the common substrate to be opposed to each other with the gap, allowances may be required between the substrates in positioning of the substrates. Such allowances may be added to design dimensions for blocking the leakage of light from the opening. Therefore, the aperture ratio may be reduced. The common electrode and the position detection lines are disposed on the array substrate, it is not necessary to consider such allowances for defining the positional relationships between the position detection lines and the first opening edge or the second opening edge of the opening in the common electrode. Although such allowances are added to the design dimensions of the light blocking portion, the pixel opening are less likely to be reduced in size and thus the aperture ratio is less likely to be reduced.

(11) The openings in the common electrode may include dividing openings separating the position detection electrodes from one another. According to the configuration, the dividing openings that separate the adjacent position detection electrodes from one another are disposed to overlap at least sections of the position detection lines and defined as the openings. With the dividing openings that are existing structures, parasitic capacitances between the position detection lines and the position detection electrodes that are not connected to the position detection lines can be reduced.

(12) The common electrode may include a pixel overlapping opening at a position that overlaps the at least one pixel electrode. The openings may be aligned to the pixel overlapping opening in a direction perpendicular to a direction in which the openings may be arranged relative to the pixel overlapping opening. In comparison to a configuration in which the openings are not aligned to the pixel overlapping opening in the direction perpendicular to the direction, the opening and the pixel overlapping opening can be efficiently arranged and thus the electric resistances related to the position detection electrodes prepared by dividing the common electrode can be reduced.

(13) The display device may include at least one signal line for transmitting a signal supplied to the at least one pixel electrode. The at least one pixel electrode may include pixel electrodes and the at least one signal line may include signal lines. The pixel electrodes and the signal lines may be disposed in a direction that crosses a direction in which the position detection lines extend. The position detection lines may be disposed to sandwich the pixel electrodes in a direction in which the pixel electrodes are arranged. The signal lines may be disposed such that a distance between the signal lines that sandwich corresponding one of the pixel electrodes and corresponding one of the position detection lines is larger than a distance between the signal lines that sandwich corresponding one of the pixel electrodes. According to the configuration, a size of the pixel electrodes sandwiched between the signal lines adjacent to each other in the direction in which the pixel electrodes are arranged together with the position detection lines and a size of the pixel electrodes sandwiched between the signal lines adjacent to each other in the direction in which the pixel electrodes are arranged without the position detection lines can be equalized. Therefore, the pixel electrodes have the same levels of the electrical performance and the optical performance and thus a proper level of display performance can be achieved.

Advantageous Effect of the Invention

According to the present invention, a reduction in the aperture ratio can be reduced.

BRIEF DESCRIPTION OF THE DRAWINGS

FIG. 12 is a cross-sectional view along center lines of pixels in a liquid crystal panel according to a sixth embodiment of the present invention.

FIG. 13 is a cross-sectional view along center lines of pixels in a liquid crystal panel according to a seventh embodiment of the present invention.

MODES FOR CARRYING OUT THE INVENTION

First Embodiment

Figure 1:
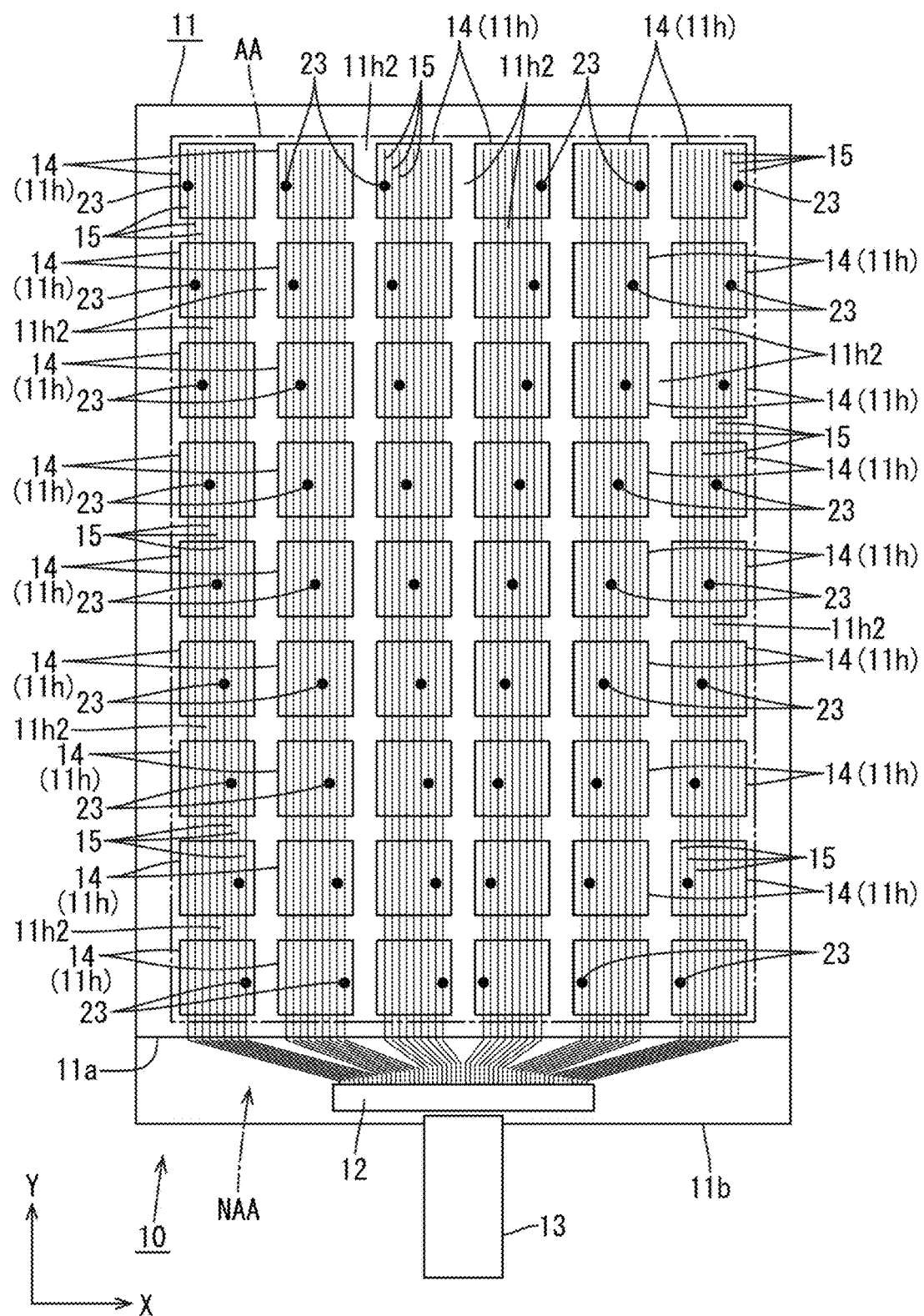
FIG. 1 is a plan view illustrating two-dimensional arrangement of position detection electrodes and position detection lines in a liquid crystal panel in a liquid crystal display device according to a first embodiment of the present invention.

A first embodiment of the invention will be described with reference to FIGS. 1 to 5. In this embodiment section, a liquid crystal display device 10 (a display device with a position input function) with a touch panel function (a position input function) will be described. X-axes, Y-axes, and Z-axes may be present in the drawings. The axes in each drawing correspond to the respective axes in other drawings. An upper side and a lower side in FIGS. 3 and 4 correspond to a front side and a back side of the liquid crystal display device 10, respectively.

As illustrated in FIG. 1, the liquid crystal display device 10 includes at least a liquid crystal panel 11 (a display panel) and a backlight unit (a lighting device). The liquid crystal panel 11 is configured to display images. The backlight unit is an external light source to illuminate the liquid crystal panel 11 for image display. The backlight unit is disposed behind the liquid crystal panel 11. The backlight unit includes light sources configured to emit white light (e.g., LEDs) and optical members for converting the light from the light sources into planar light by applying optical effects to the light from the light sources. The backlight is not illustrated in the drawings.

As illustrated in FIG. 1, an inner area of the liquid crystal panel 11 is configured as a display area AA in which images are displayed (an area defined by a chain line in FIG. 1). An outer area in a frame shape surrounding the display area AA is configured as a non-display area NAA of the liquid crystal panel 11 in which the images are not displayed. In the non-display area NAA, a driver 12 and a flexible substrate 13 that are components for supplying various signals related to a display function and a touch panel function are mounted. The driver 12 is an LSI chip including a driver circuit therein and mounted in the non-display area NAA of the liquid crystal panel 11 through the chip-on-glass (COG) technology. The driver 12 processes the signals transmitted via the flexible substrate 13. The flexible substrate 13 includes a synthetic resin substrate (e.g., polyimide-based resin substrate) having insulating property and flexibility and multiple traces (not illustrated) formed on the substrate. A first end of the flexible substrate 13 is connected to the non-display area NAA of the liquid crystal panel 11 and a second end of the flexible substrate 13 is connected to a control circuit board (a signal source). The signals from the control circuit board are transmitted to the liquid crystal panel 11 via the flexible substrate 13, processed by the driver 12 in the non-display area NAA, and output to the display area AA.

Figure 3:
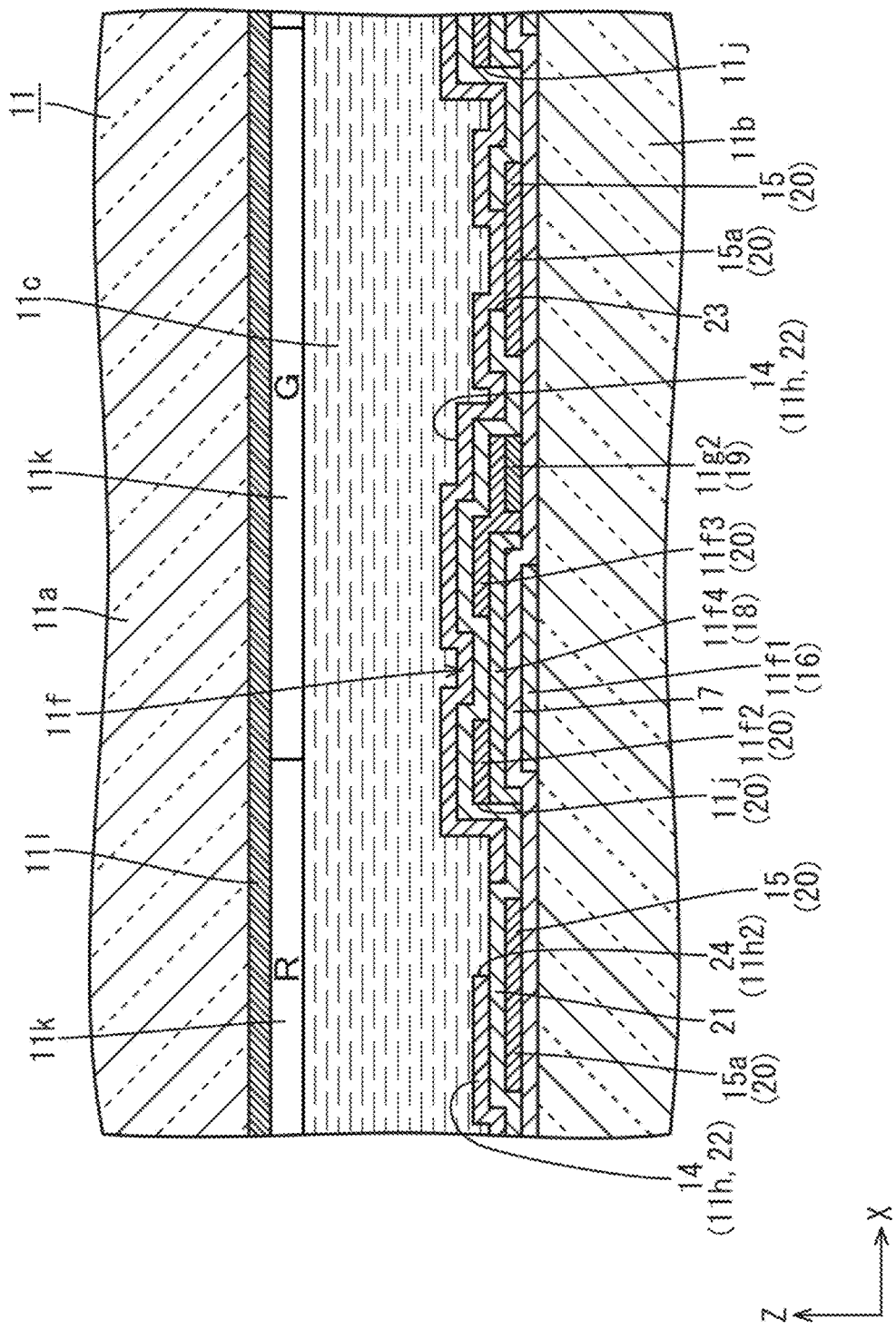
FIG. 3 is a cross-sectional view along line A-A in FIG. 2.

The liquid crystal panel 11 will be described in detail. As illustrated in FIG. 3, the liquid crystal panel 11 includes a pair of substrates 11a and 11b and a liquid crystal layer 11c (a medium layer) between the substrates 11a and 11b. The liquid crystal layer 11c includes liquid crystal molecules that are substances having optical characteristics that change according to application of an electric field. The liquid crystal layer 11c is surrounded by a sealing member, which is not illustrated, disposed between the substrates 11a and 11b. The liquid crystal layer 11c is sealed by the sealing member. One of the substrates 11a and 11b on the front side is a CF substrate 11a (a common substrate) and the other on the rear side (back side) is the array substrate 11b (an active matrix substrate, a component substrate). The CF substrate 11a and the array substrate 11b include substantially transparent glass substrates and various films formed in layers on the glass substrates. Polarizing plates, which are not illustrated, are attached to outer surfaces of the substrates 11a and 11b.

Figure 2:
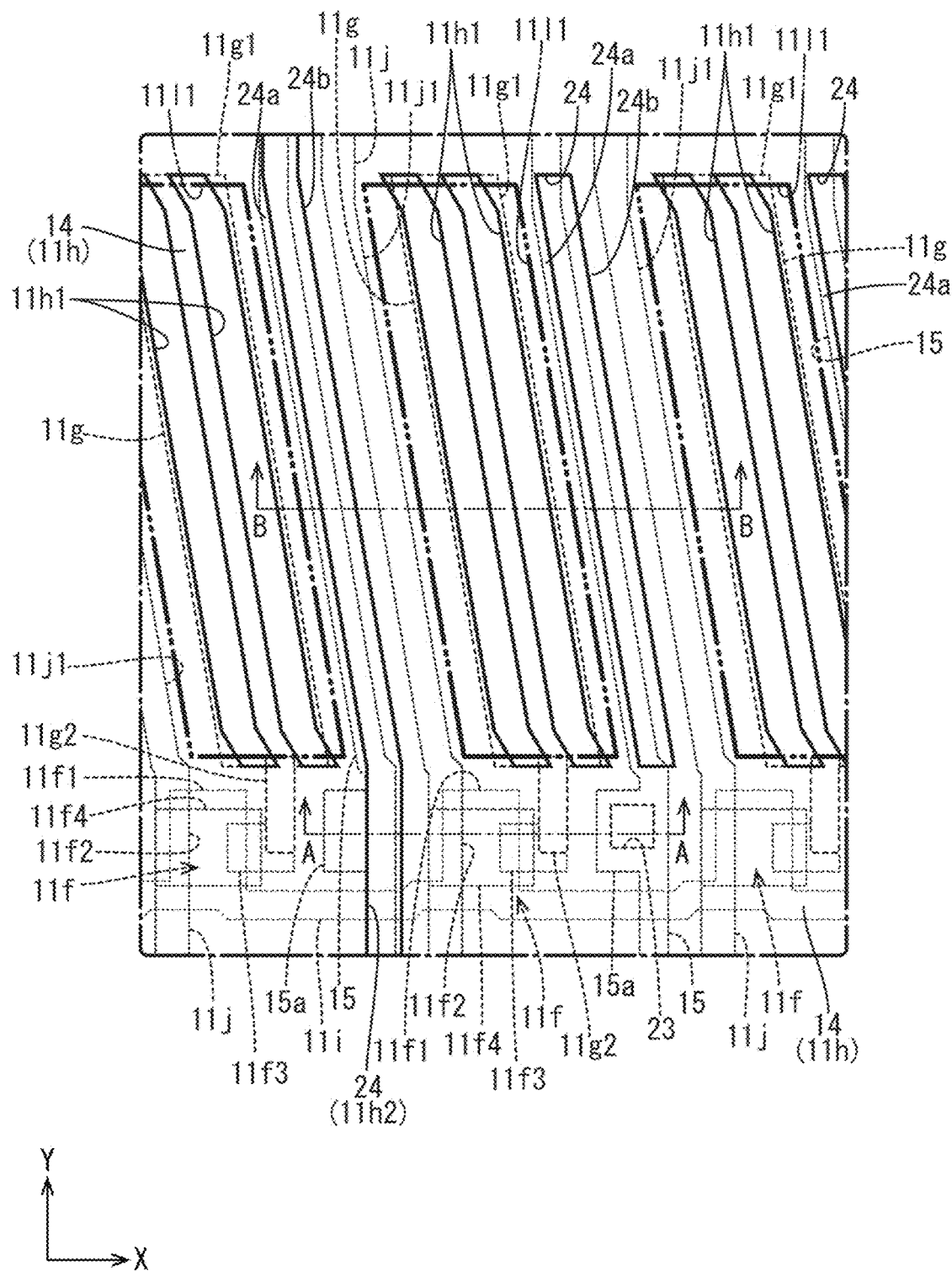
FIG. 2 is a plan view illustrating pixel electrodes in an array substrate included in the liquid crystal panel.

As illustrated in FIG. 2, thin film transistors (TFTs) 11f (switching components) and pixel electrodes 11g are arranged in a matrix in an area of an inner surface of the array substrate 11b (on a liquid crystal layer 11c side, on an opposed surface side opposed to the CF substrate 11a) in the display area AA. Lines of the TFTs 11f and lines of the pixel electrodes 11g are arranged along the X-axis direction and the Y-axis direction. Gate lines 11i (scanning lines) and source lines 11j (signal lines, data lines) are routed perpendicular to each other to surround the TFTs 11f and the pixel electrodes 11g. The gate lines 11i extend substantially straight in a direction substantially along the X-axis direction. The source lines 11j extend in a direction substantially along the Y-axis direction. Specifically, portions of the source lines 11j adjacent to the pixel electrodes 11g (diagonally extending portions 11j1) extend in a diagonal direction angled to the X-axis direction and the Y-axis direction. Portions of the source lines 11j not adjacent to the pixel electrodes 11g (including portions that cross the gate lines 11i) linearly extend along the Y-axis direction. The gate lines 11i are connected to gate electrodes 11f1 of the TFTs 11f and the source lines 11j are connected to source electrodes 11f2 of the TFTs 11f. The pixel electrodes 11g are connected to drain electrodes 11f3 of the TFTs 11f. The TFTs 11f are driven based on signals supplied to the gate lines 11i and the source lines 11j. Through the driving of the TFTs 11f, application of potentials to the pixel electrodes 11g is controlled. Each of the pixel electrodes 11g has a vertically-long parallelogram shape in a plan view. The source lines 11j are disposed between the pixel electrodes 11g that are adjacent to each other in a direction along short edges of the pixel electrodes 11g (the X-axis direction). The gate lines 11i are disposed between the pixel electrodes 11g that are adjacent to each other in a direction along long edges of the pixel electrodes 11g (the Y-axis direction). The long edges of the pixel electrodes 11g are parallel to the diagonally extending portions 11j1 of the source lines 11j.

Figure 4:
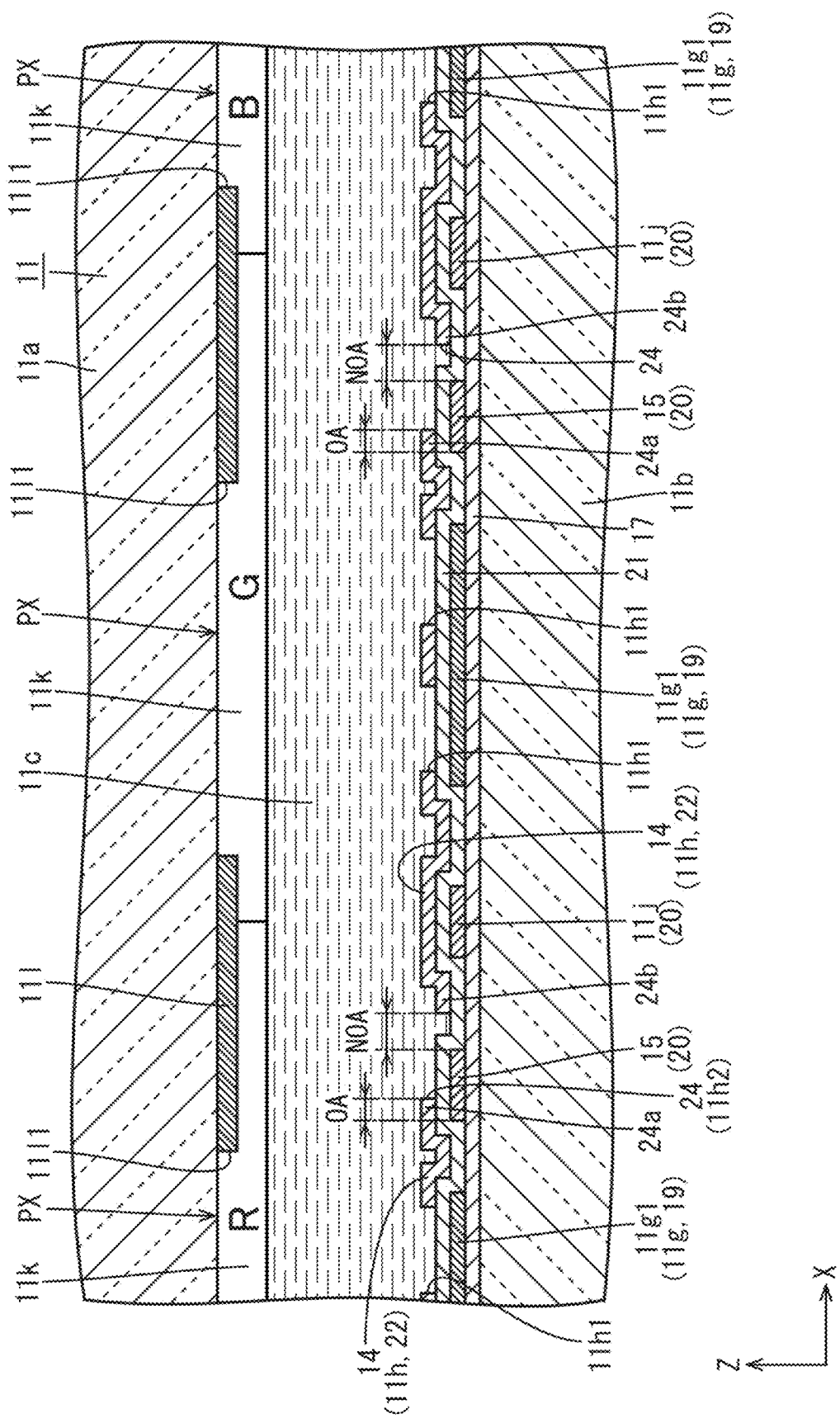
FIG. 4 is a cross-sectional view along line B-B in FIG. 2.

As illustrated in FIGS. 2 and 4, a common electrode 11h is formed to overlap all pixel electrodes 11g in a layer upper than the pixel electrodes 11g (closer to the liquid crystal layer 11c) in the display area AA on an inner surface side of the array substrate 11b. The common electrode 11h spreads over substantially an entire area of the display area AA to apply a reference voltage that is normally about constant. The common electrode 11h includes pixel overlapping openings 11h1 (pixel overlapping slits, alignment control slits) are formed in areas overlapping the pixel electrodes 11g (two pixel overlapping openings in each overlapping area in FIG. 2). Each of the pixel overlapping openings 11h1 has a vertically-long shape. The pixel overlapping openings 11h1 extend along the diagonally extending portions 11j1 of the source lines 11j (long edges of the pixel electrodes 11g). When a potential difference occurs between the pixel electrode 11g and the common electrode 11h that overlap each other as the pixel electrode 11g is charged, a fringe electric field (an oblique electric field) is created between an opening edge of the pixel overlapping opening 11h1 and the pixel electrode 11g. The fringe electric field includes a component parallel to the plate surface of the array substrate 11b and a component normal to the plate surface of the array substrate 11b. With the fringe electric field, orientations of the liquid crystal molecules included in the liquid crystal layer 11c can be controlled. Namely, the liquid crystal panel 11 according to this embodiment operates in fringe field switching (FFS) mode. In this embodiment, two pixel overlapping openings 11h1 are provided. However, the alignment control function and the display function can be exerted with at least one pixel overlapping opening 11h1. The direction in which the pixel overlapping openings 11h1 extend is not limited to one direction. In one pixel PX, the pixel overlapping opening 11h1 may dogleg. Alternatively, the pixel overlapping openings 11h1 in the pixels PX adjacent to each other in the Y-axis direction may extend in different directions.

As illustrated in FIG. 4, color filters 11k that exhibit three different colors of red (R), green (G), and blue (B) are disposed in the display area AA on the inner surface side of the CF substrate 11a. The color filters 11k that exhibit different colors are repeatedly arranged along the gate lines 11i (in the X-axis direction) and the color filters 11k are arranged in lines along the source lines 11j (substantially the Y-axis direction). Namely, the color filters 11k are arranged in a stripe as a whole. The color filters 11k are arranged to overlap the pixel electrodes 11g on the array substrate 1ib, respectively, in a plan view. The color filters 11k that are adjacent to each other in the X-axis direction and exhibit different colors each other are arranged such that a boundary therebetween (a color boundary) overlap the source lines 11j and a light blocking portion 11l. In the liquid crystal panel 11, the R, the G, and the B color filters 11k that are arranged along the X-axis direction and three pixel electrodes 11g opposed to the respective color filters 11k compose three colors of pixels PX. In the liquid crystal panel 11, the R, the G, and the B pixels PX that are adjacent to one another in the X-axis direction form display pixels configured to perform color display in predefined tones. An interval of the pixels PX in the X-axis direction is about 10 µm to 30 µm.

As illustrated in FIGS. 2 and 4, the light blocking portion 11l (an inter-pixel portion, a black matrix) configured to block light is formed in the display area AA on the inner surface side of the CF substrate 11a. The light blocking portion 11*l* is formed in a grid pattern in a plan view to separate the adjacent pixels PX (the pixel electrodes 11*g*). The light blocking portion 11*l* includes pixel openings 11*l*1 at positions overlapping large areas of the pixel electrodes 11*g* on the array substrate 11*b* side in a plan view. The pixel openings 11*l*1 are arranged in a matrix within the plate surface of the CF substrate 11*a*. The numbers of the pixel openings 11*l*1 are arranged in the X-axis direction and the Y-axis direction. Each pixel opening 11*l*1 has a vertically-long rectangular two-dimensional shape along an outline of the pixel electrode 11*g*. The pixel opening 11*l*1 has a short dimension larger than the short dimension of the pixel electrode 11*g* and a long dimension slightly smaller than the long dimension of the pixel electrode 11*g*. The pixel openings 11*l*1 pass light therethrough for display at the pixels PX. The light blocking portion 11*l* restricts light from traveling between the adjacent pixels PX to ensure independency of tones of each pixel PX. Especially, sections of the light blocking portion 11*l* extending along the source lines 11*j* reduce color mixture between the pixels PX that exhibit different colors. The light blocking portion 11*l* overlaps at least the gate lines 11*i* and the source lines 11*j* on the array substrate 11*b* in a plan view. Alignment films (not illustrated) for orienting the liquid crystal molecules in the liquid crystal layer 11*c* are formed on innermost surfaces of the substrates 11*a* and 11*b* in contact with the liquid crystal layer 11*c*. A planarization film may be formed between the alignment film and the color filters 11*k*.

The liquid crystal panel 11 according to this embodiment has a display function for displaying images and a touch panel function (a position input function) for detecting positions of input by a user performs based on displayed images (input positions). The liquid crystal panel 11 includes an integrated touch panel pattern (with an in-cell technology) for exerting the touch panel function. The touch panel pattern uses so-called a projection type electrostatic capacitance method. A self-capacitance method is used for detection. As illustrated in FIG. 1, the touch panel pattern includes touch electrodes 14 (position detection electrodes) are disposed on the array substrate 11*b* of the pair of substrates 11*a* and 11*b* and arranged in a matrix within the plate surface of the array substrate 11*b*. The touch electrodes 14 are disposed in the display area AA of the array substrate 11*b*. The display area AA of the liquid crystal panel 11 substantially corresponds with a touch area in which input positions are detectable (a position input area). The non-display area NAA substantially corresponds with a non-touch area in which input positions are not detectable (a non-position input area). When the user intends to input a position based on a displayed image in the display area AA of the liquid crystal panel 11 recognized by the user and brings his or her finger (a position input body), which is a conductive member but not illustrated, closer to the surface of the liquid crystal panel 11 (a display surface), the finger and the touch electrode 14 form a capacitor. A capacitance measured at the touch electrode 14 close to the finger changes as the finger approaches to the touch electrode 14 is different from a capacitance at the touch electrodes 14 farther from the finger. Based on the difference in capacitance, the input position can be detected.

As illustrated in FIG. 1, the touch electrodes 14 are prepared from the common electrode 11*h* on the array substrate 11*b*. The common electrode 11*h* includes dividing openings 11*h*2 (dividing slits) for separating the adjacent touch electrodes 14 from each other in addition to the pixel overlapping openings 11*h*1. The dividing openings 11*h*2 include portions that cross the common electrode 11*h* in the X-axis direction for an entire length of the common electrode 11*h* and portions that cross the common electrode 11*h* in the Y-axis direction for an entire length of the common electrode 11*h*. The dividing openings 11*h*2 form a grid in a plan view. The common electrode 11*h* includes the touch electrodes 14 that are separated from one another by the dividing openings 11*h*2 to form the grid in the plan view and electrically independent from one another. In the display area AA, lines of the touch electrodes 14 separated by the dividing openings 11*h*2 are arranged in the X-axis direction and the Y-axis direction, that is, the touch electrodes 14 are arranged in a matrix. Each of the touch electrodes 14 has a rectangular shape in the plan view with edges in some millimeters (e.g., about 2 to 4 mm). The touch electrodes 14 are significantly larger than the pixels PX (the pixel electrodes 11*g*) in the plan view. Namely, each touch electrode 14 is disposed in an area that straddles more than one pixel PX in the X-axis direction and the Y-axis direction (e.g., tens of or millions of the pixels PX). Touch lines 15 (position detection lines) on the array substrate 11*b* are selectively connected to the touch electrodes 14. The touch lines 15 extend parallel to the source lines 11*j* on the array substrate 11*b* substantially along the Y-axis direction. The touch lines are connected to the specific touch electrodes 14 among the touch electrodes 14 arranged in the Y-axis direction. The touch lines 15 are connected to a detection circuit, which is not illustrated. The detection circuit may be included in the driver 12 or provided outside the liquid crystal panel 11 via the flexible substrate 13. The touch lines 15 supply reference potential signals for the display function and touch signals for the touch function (position detection signals) to the touch electrodes 14 at different timing. The reference potential signals are transmitted to the touch lines 15 at the same timing and thus all the touch electrodes 14 have the reference potential and function as the common electrode 11*h*. FIG. 1 schematically illustrates arrangement of the touch electrodes 14. The number and the arrangement of the touch electrodes 14 can be altered from those illustrated in the drawings where appropriate.

Films disposed on top of each other on the inner surface of the array substrate 11*b* will be described. As illustrated in FIG. 3, a first metal film 16 (a first conductive film), a gate insulating film 17, a semiconductor film 18, a first transparent electrode film 19, a second metal film 20 (a second conductive film), an interlayer insulating film 21 (an insulating film), and a second transparent electrode film 22 are stacked on the array substrate 11*b* in this sequence from a lower layer. The first metal film 16 may be a single-layer film made of one kind of metal, a multilayer film made of a material containing different kinds of metals, or an alloy. The first metal film 16 has conductivity and light blocking properties. The gate lines 11*i* and the gate electrodes 11*f*1 of the TFTs 11*f* are portions of the first metal film 16. The gate insulating film 17 is made of an inorganic material such as silicon nitride ($SiN_X$) and silicon oxide ($SiO_2$). The gate insulating film 17 insulates the first metal film 16 in the lower layer from the semiconductor film 18, the first transparent electrode film 19, and the second metal film 20 in the upper layer. The semiconductor film 18 is a thin film made of an oxide semiconductor material or amorphous silicon. Channels 11*f*4 (semiconductor portions) connected to the source electrodes 11*f*2 and the drain electrodes 11*f*3 in the TFTs 11*f* are portions of the semiconductor film 18. The first transparent electrode film 19 is made of a transparent electrode film (e.g., indium tin oxide (ITO)). The pixel electrodes 11*g* are portions of the first transparent electrode film 19. Similar to the first metal film 16, the second metal film 20 may be a single-layer film made of one kind of metal, a multilayer film made of a material containing different kinds of metals, or an alloy. The second metal film 20 has conductivity and light blocking properties. The source lines 11*j*, the touch lines 15, and the source electrodes 11*f*2 and the drain electrodes 11*f*3 of the TFTs 11*f* are portions of the second metal film 20. Similar to the gate insulating film 17, the interlayer insulating film 21 is made of an inorganic material such as silicon nitride ($SiN_x$) and silicon oxide ($SiO_2$). The interlayer insulating film 21 insulates the semiconductor film 18, the first transparent electrode film 19, and the second metal film 20 in the lower layer from the second transparent electrode film 22 in the upper layer. The second transparent electrode film 22 is made of a transparent electrode material similar to the first transparent electrode film. The common electrode 11*h* (the touch electrodes 14) is prepared from the second transparent electrode film 22.

Configurations of the TFTs 11*f* and the pixel electrodes 11*g* will be described in detail. As illustrated in FIGS. 2 and 3, the TFTs 11*f* include the gate electrodes 11*f*1 that branch off from the gate lines 11*i*. The gate electrodes 11*f*1 protrude from sections of the gate lines 11*i* crossing the source lines 11*j* along the Y-axis direction toward the pixel electrodes 11*g* to be connected. Each of the gate electrodes 11*f*1 has a rectangular shape in a plan view. The gate electrodes 11*f*1 are provided for driving the TFTs 11*f* based on the scan signals supplied to the gate lines 11*i* to control currents between the source electrodes 11*f*2 and the drain electrodes 11*f*3. The TFTs 11*f* includes the source electrodes 11*f*2 that are sections of the source lines 11*j* overlapping the gate electrodes 11*f*1. The sections of the source electrodes 11*f*2 linearly extend in the Y-axis direction. The TFTs 11*f* include the drain electrodes 11*f*3 disposed at distances from the source electrodes 11*f*2. Each of the drain electrodes 11*f*3 has an L shape in the plan view. The drain electrodes 11*f*3 include first ends opposed to the source electrodes 11*f*2 and connected to the channels 11*f*4 and second ends connected to the pixel electrodes 11*g*. The second ends of the drain electrodes 11*f*3 prepared from the second metal film 20 directly contact the pixel electrodes 11*g* prepared from the first transparent electrode film 19 and disposed immediately below the drain electrodes 11*f*3.

As illustrated in FIGS. 2 and 3, the pixel electrodes 11*g* include pixel electrode bodies 11*g*1 and contact portions 11*g*2. The pixel electrode bodies 11*g*1 overlap the pixel openings 11/1 of the light blocking portion 11*l*. Each of the pixel electrode bodies 11*g*1 has a parallelogram shape. The contact portions 11*g*2 protrude from the pixel electrode bodies 11*g*1 in the Y-axis direction toward the TFTs 11*f*. The contact portions 11*g*2 are connected to the drain electrodes 11*f*3. The TFTs 11*f* include the channels 11*f*4 that overlap the gate electrodes 11*f*1 via the gate insulating film 17 and connected to the source electrodes 11*f*2 and the drain electrodes 11*f*3. The channels 11*f*4 extend in the X-axis direction to cross the gate electrodes 11*f*1. First ends and second ends of the channels 11*f*4 are connected to the source electrodes 11*f*2 and the drain electrodes 11*f*3, respectively. When the TFTs 11*f* turn on based on the scan signals supplied to the gate electrodes 11*f*1, image signals (signals, data signals) supplied to the source lines 11*j* are transmitted from the source electrodes 11*f*2 to the drain electrodes 11*f*3 via the channels 11*f*4 prepared from the semiconductor film 18. As a result, the pixel electrodes 11*g* are charged.

Next, a configuration of the touch lines 15 will be described in detail. As illustrated in FIGS. 2 and 4, the touch lines 15 are portions of the second metal film 20, the portions of which are configured as the source lines 11*j*. Similar to the first transparent electrode film 19, the touch lines 15 are laid on the interlayer insulating film 21 in the upper layer. Namely, the touch lines 15, the source lines 11*j*, and the pixel electrodes 11*g*, which are the portions of the first transparent electrode film 19, are disposed in the same layer. Therefore, short circuits are less likely to occur among them by separating them in the X-axis direction with gaps. The touch lines 15 that are the portions of the second metal film 20 having the light blocking properties are disposed not to overlap the pixel electrodes 11*g*. Therefore, the aperture ratio of the pixels PX is less likely to unnecessarily decrease. The touch lines 15 disposed adjacent to the source lines 11*j* on an opposite side from the pixel electrodes 11*g* to which the source lines 11*j* are electrically connected via the TFTs 11*f* with gaps between the touch lines 15 and the source lines 11*j*. Namely, the source lines 11*j* are disposed closer to the pixel electrodes 11*g* to which the source lines 11*j* are connected relative to the touch lines 15 with gaps between the source lines 11*j* and the pixel electrodes 11*g*. Further, the touch lines 15 are sandwiched between the source lines 11*j* and the pixel electrodes 11*g* to which the relevant source lines 11*j* are not connected. Each of the touch lines 15 has a width about equal to the width of the source lines 11*j*.

As illustrated in FIGS. 2 and 3, the touch lines 15 prepared from the second metal film 20 are connected to the relevant touch electrodes 14 via contact holes 23 in the interlayer insulating film 21. The touch lines 15 include sections adjacent to the TFTs 11*f* (the drain electrodes 11*f*3) in the X-axis direction and having a larger width. The sections that are defined as wide sections 15*a* function as connecting pads for the touch electrodes 14. The wide sections 15*a* of the touch lines 15 that cross multiple TFTs 11*f* that arranged in the Y-axis direction are located adjacent to the respective TFTs 11*f*. The contact holes 23 are provided for one of or some of the wide sections 15*a*. By providing the wide sections 15*a* for the TFTs 11*f* (or the pixel electrodes 11*g*), respectively, parasitic capacitances between the touch lines 15 and the corresponding TFTs 11*f* or the corresponding pixel electrodes 11*g* can be equalized. The touch lines 15 extend in the Y-axis direction to cross all the touch electrodes 14. However, the touch lines 15 are connected to the specific touch electrodes 14. The relevant touch lines 15 and the non-relevant touch lines 15 overlap the touch electrodes 14 via the interlayer insulating film 21.

As illustrated in FIGS. 2 and 4, the common electrode 11*h* including the touch electrodes 14 includes openings 24 at least partially overlapping the touch lines 15. The openings 24 extend substantially in the Y-axis direction and parallel to the touch lines 15. Each of the openings 24 is vertically long in the plan view (elongated in the extending direction of the touch lines 15). The long dimension (a dimension in the Y-axis direction) of each of the openings 24 (except for the dividing openings 11*h*2, which will be described later) is smaller than the long dimension of each of the pixel electrodes 11*g* and about equal to the long dimension of each of the pixel overlapping openings 11*h*1 of the common electrode 11*h*. The width of each of the openings 24 (a dimension in the X-axis direction) is larger than the width of the source lines 11*j* or the width of the touch lines 15 and about equal to the width of the pixel overlapping openings 11*h*1 of the common electrode 11*h*. With the openings 24, parasitic capacitances that may appear between the touch lines 15 and the non-relevant touch electrodes 14 can be reduced. Therefore, proper sensitivity in detection of position input by the finger can be achieved. If the openings in the common electrode are wider than the touch lines 15 and gaps are provided between opening edges and the touch lines in the width direction in the plan view, electric fields may be created at the opening edges facing the gaps resulting in leakages of light around the edges. This may reduce the display quality. To reduce the leakages of light, the light blocking portion 11*l* on the CF substrate 11*a* may be expanded. However, the pixel openings 11/1 may be reduced and thus the aperture ratio of the pixels may be reduced.

Figure 5:
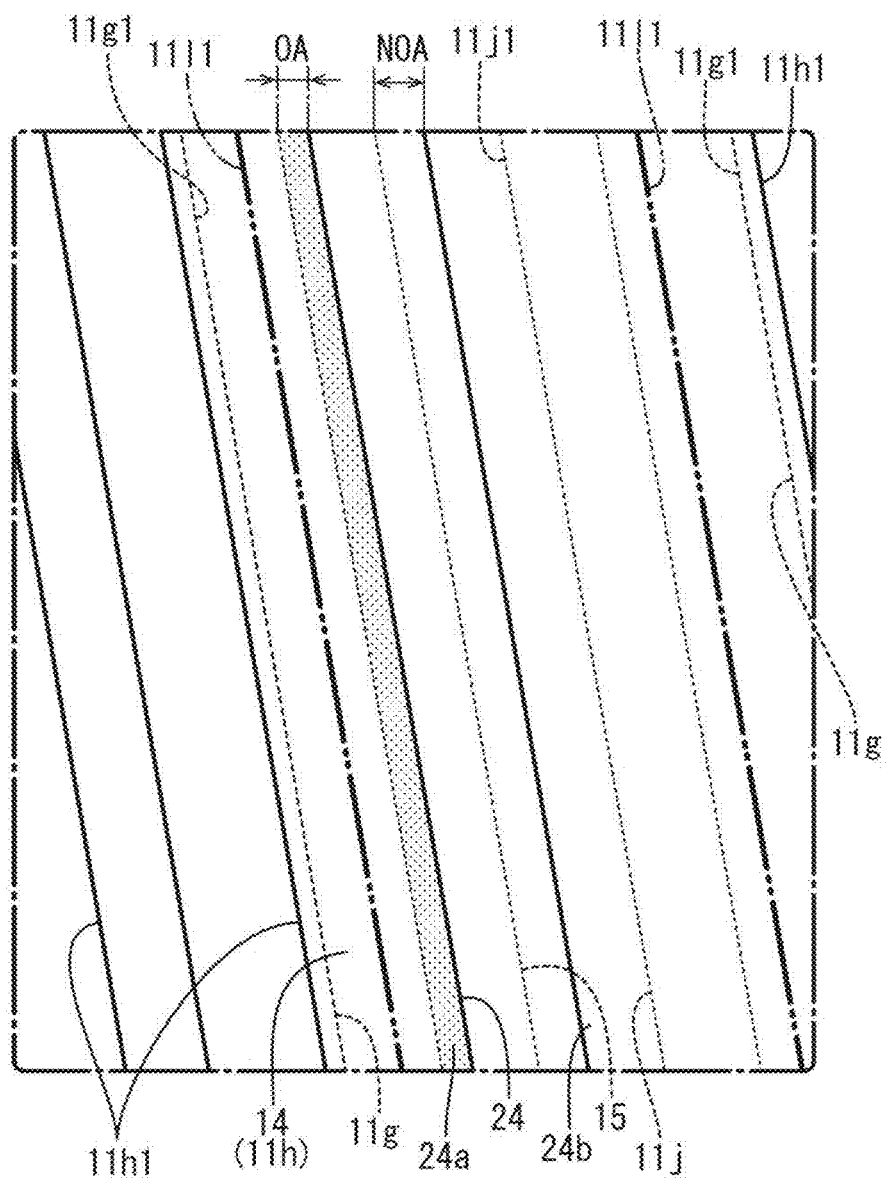
FIG. 5 is a magnified plan view of a portion of FIG. 2 including openings.

As illustrated in FIGS. 4 and 5, the common electrode 11*h* in this embodiment includes the openings 24 that include first opening edges 24*a* located closer to the pixel electrodes 11*g* relative to the touch lines 15 (on the left in FIGS. 4 and 5) in the X-axis direction (the width direction of the openings 24, the arrangement direction in which the touch lines 15 are arranged) and second opening edges 24*b* located on an opposite side from the pixel electrodes 11*g* relative to the touch lines 15, that is, closer to the source lines 11*j* (on the right in FIGS. 4 and 5). The first opening edges 24*a* are located closer to the touch lines 15 relative to the second opening edges 24*b*. The first opening edges 24*a* of the openings 24 closer to the touch lines 15 are disposed closer to the opening edges of the pixel openings 11/1 of the light blocking portion 11*l* on the CF substrate 11*a* relative to the second opening edges 24*b*. The second opening edges 24*b* located farther from the touch lines 15 are disposed closer to color borders of the color filters 11*k* that are adjacent to one another in the X-axis direction on the CF substrate 11*a* to present different colors relative to the first opening edges 24*a*. According to the configuration, a larger amount of light is blocked by the touch lines 15 around the first opening edges 24*a* of the openings 24 in comparison to around the second opening edges 24*b*. Therefore, the leakage of light is less likely to occur around the first opening edges 24*a* of the openings 24, that is, on the pixel electrode 11*g* sides relative to the touch lines 15 (opening edge sides of the pixel openings 11/1). Because it is not necessary to expand areas of the light blocking portion 11*l* toward on the pixel electrode 11*g* side relative to the touch lines 15, the pixel openings 11/1 can be provided with a sufficient size. Therefore, the aperture ratio of the pixels PX is less likely to be reduced.

As illustrated in FIG. 4, the light blocking portion 11*l* is disposed on the CF substrate 11*a* that is bonded to the array substrate 11*b*. To properly block the leakage of light described earlier, it is necessary to define dimensions of the light blocking portion 11*l* in consideration of allowances in positioning of the substrates 11*a* and 11*b* during the bonding. In the configuration that is less likely to cause the leakage of light on the pixel electrode 11*g* side (closer to the first opening edges 24*a* of the openings 24) relative to the touch lines 15, about halves of the allowances (e.g., about 5 μm) are required for the dimensions of the light blocking portion 11*l* because only the leakage of light on the source line 11*j* side (on a color border side of the color filters 11*k*) relative to the touch lines 15 needs to be considered. In a configuration in which pitches in arrangement of the pixels PX decrease as the definition increases, a decrease in aperture ratio of the pixels PX can be further properly suppressed. The common electrode 11*h* and the touch lines 15 are disposed on the array substrate 11*b*. Therefore, it is not necessary to consider the allowances to define positional relationships between the touch lines 15 and the first opening edges 24*a* or the second opening edges 24*b* of the openings 24 in the common electrode 11*h*. Even if the allowances are added to the dimensions of the light blocking portion 11*l* on the CF substrate 11*a*, the size of the pixel openings 11/1 is less likely to be reduced and thus the aperture ratio is less likely to be reduced.

As illustrated in FIGS. 4 and 5, the second opening edges 24*b* of the openings 24 in the common electrode 11*h* does not overlap the touch lines 15 but the first opening edges 24*a* overlap the touch lines 15. In FIG. 5, an overlapping area OA between the touch line 15 and the first opening edge 24*a* of the opening 24 in the common electrode 11*h* is shaded. The first opening edges 24*a* of the openings 24 overlap edges of the touch lines 15 on the pixel electrodes 11*g* with respect to the X-axis direction (the opening edge side of the pixel openings). However, the second opening edges 24*b* are away from the edges of the touch lines 15 on the source line 11*j* side with respect to the X-axis direction (on the color boarder side of the color filters 11*k*), that is, do not overlap the touch lines 15. A width of the overlapping area OA between the first opening edge 24*a* and the touch line 15 is smaller than a distance between the second opening edge 24*b* and the touch line 15, that is, a width of the non-overlapping area NOA. Specifically, the width between the first opening edge 24*a* and the touch line 15 is about a half of the width of the non-overlapping area NOA. A length of the overlapping area OA between the first opening edge 24*a* and the touch line 15 is equal to the length of the opening 24. According to the configuration, a gap is present between the second opening edge 24*b* of the opening 24 and the touch line 15 in a plan view but such a gap is not present between the first opening edge 24*a* of the opening 24 and the touch line 15. Rays of light traveling from the backlight unit toward the second opening edge 24*b* may enter the liquid crystal layer 11*c* through the gap and create a leakage of light due to an electric field created at the second opening edge 24*b*. Rays of light traveling from the backlight unit toward the first opening edge 24*a* are more likely to be blocked by the touch line 15 and thus a leakage of light is less likely to be created. Without the light blocking portion 11*l* of the CF substrate 11*a*, the leakage of light is more likely to be reduced on the pixel electrode 11*g* side relative to the touch line 15. Therefore, a larger size of the pixel openings 11/1 can be provided in the light blocking portion 11*l* and thus the aperture ratio of the pixels PX is further less likely to be reduced.

As illustrated in FIG. 4, the touch lines 15 prepared from the second metal film 20 and the pixel electrodes 11*g* prepared from the first transparent electrode film are disposed in the same layer. The interlayer insulating film 21 is disposed between the touch lines 15 and the common electrode 11*h* that is prepared from the second transparent electrode film 22. The interlayer insulating film 21 is also disposed between the pixel electrodes 11*g* and the common electrode 11*h*. In comparison to a configuration in which touch lines are disposed behind the pixel electrodes 11*g* (on an opposite side from the common electrode 11*h*) via the second interlayer insulating film (the second insulating film), the production cost can be reduced by the cost of the second insulating film because the second insulating film is not required. The source lines 11*j* are disposed in the layer in which the touch lines 15 are disposed and away from the touch lines 15 in the X-axis direction. In comparison to a configuration in which the source lines are disposed behind the touch lines 15 (on an opposite side from the common electrode 11*h*) to overlap the touch lines 15 via the second interlayer insulating film, the production cost can be reduced by the cost of the second insulating film because the second insulating film is not required. Because the source lines 11*j* are disposed away from the touch lines 15 in the X-axis direction to be closer to the pixel electrodes 11*g* to be connected, the touch lines 15 are disposed between the source lines 11*j* and the pixel electrodes 11*g* to which the source lines 11*j* are not connected. Because the touch lines 15 and the common electrode 11*h* are at the reference potential (the same potential), when the signals are transmitted through the source lines 11*j*, the pixel electrodes 11*g* that are not connected to the source lines 11*j* can be shielded from the electric field that may be created by the source lines with the touch lines 15. Occurrence of crosstalk can be reduced and thus a proper level of display quality can be achieved.

As illustrated in FIG. 2, the dividing openings 11*h*2 of the common electrode 11*h* separating the adjacent touch electrodes 14 from each other function as the openings 24. Namely, the dividing openings 11*h*2 are located to overlap the touch lines 15 (portions of the touch lines 15 closer to the source lines 11*j* in the X-axis direction). The dividing openings 11*h*2 extend in the Y-axis direction for the entire length of the display area AA, that is, the dividing openings 11*h*2 overlap the touch lines 15 for the entire length of the touch lines 15. With the dividing openings 11*h*2 that are existing structures, parasitic capacitances that may appear between the touch lines 15 and the touch electrodes 14 that are not connected to the touch lines 15 can be reduced. The openings 24 of the common electrode 11*h* except for the dividing openings 11*h*2 are aligned to the pixel overlapping openings 11*h*1 with respect to the Y-axis direction (the direction perpendicular to the arrangement direction relative to the pixel overlapping openings 11*h*1). In comparison to a configuration in which the openings are not aligned with the pixel overlapping openings 11*h*1 with respect to the Y-axis direction, the openings 24 and the pixel overlapping openings 11*h*1 can be efficiently arranged. Furthermore, electrical resistances related to the touch electrodes 14 prepared by dividing the common electrode 11*h* can be reduced.

As described earlier, the liquid crystal display device 10 (the display device having the position input function) according to this embodiment includes the pixel electrodes 11*g*, the common electrode 11*h*, the touch electrodes 14 (position detection electrodes), the touch lines 15 (the position detection lines), and the light blocking portion 11*l*. The common electrode 11*h* is disposed to at least partially overlap the pixel electrodes 11*g* via the interlayer insulating film 21 (the insulating film). The touch electrodes 14 (the position detection electrodes) are prepared by dividing the common electrode 11*h* and configured so that the finger, which is the position input member, and the corresponding touch electrode 14 form a capacitor to detect a position of input by the finger, which is the position input member. The touch lines 15 are disposed not to overlap the pixel electrodes 11*g* such that at least the interlayer insulating film 21 is disposed between the common electrode 11*h* and the touch lines 15. The touch lines 15 are selectively connected to the touch electrodes 14 via at least the contact holes 23 in the interlayer insulating film 21. The light blocking portion 11*l* includes the pixel openings 11*l*1 located to overlap at least the sections of the pixel electrodes 11*g* and to block light. The common electrode 11*h* includes the openings 24 that overlap at least the sections of the touch lines 15. The opening edges 24*a* of the opening 24 on the pixel electrode 11*g* side relative to the touch lines 15 are located closer to the touch lines 15 in comparison to the second opening edges 24*b* on the opposite side from the pixel electrodes 11*g* relative to the touch lines 15.

According to the configuration, potential differences are created between the pixel electrodes 11*g* and the common electrode 11*h* based on voltages applied to the pixel electrodes 11*g*. At least the sections of the common electrode 11*h* overlap the pixel electrodes 11*g* via the interlayer insulating film 21. The image display is performed using the potential differences. The image display is performed by passing light through the pixel openings 11*l*1 overlapping at least the sections of the pixel electrodes 11*g*. The touch lines 15 are disposed such that at least the interlayer insulating film 21 is disposed between the common electrode 11*h* and the touch lines 15. The touch lines are selectively connected to the touch electrodes 14 that are prepared by dividing the common electrode 11*h* via the contact holes 23. The touch electrodes 14 are for detecting positions of input by the finger, which is the inputting member, using the signals regarding capacitances between the finger and the touch electrodes 14 supplied via the touch lines 15. The touch lines 15 are not disposed not to overlap the pixel electrodes 11*g* so that the aperture ratio is less likely to be reduced and the reduction in display quality due to the parasitic capacitances between the pixel electrodes 11*g* and the touch lines 15 is less likely to occur.

The common electrode 11*h* includes the openings 24 that overlap at least the sections of the touch lines 15. Therefore, the parasitic capacitance between any one of the touch lines 15 and the touch electrode 14 that is not connected to the touch line 15 is reduced. According to the configuration, proper sensitivity can be achieved in the position detection. If gaps are provided between opening edges of openings in the common electrode 11*h* and the touch lines 15 in a plan view, leakages of light may occur around the gaps due to electric fields created at the opening edges facing the gaps. This may reduce the display quality. To reduce the leakages of light, the area of the light blocking portion may be increased. However, the pixel openings 11*l*1 may be reduced in size and thus the aperture ratio may be reduced. In the common electrode 11*h*, the first opening edges 24*a* of the openings 24 located on the pixel electrode 11*g* side relative to the touch lines 15 are disposed closer to the touch lines 15 in comparison to the second opening edges 24*b* on the opposite side from the pixel electrodes 11*g* relative to the touch lines 15. Therefore, the leakages of light on the pixel electrode 11*g* side relative to the touch lines 15 are less likely to occur. It is not necessary to increase the area of the light blocking portion 11*l* on the pixel electrode 11*g* side relative to the touch lines 15. Therefore, the pixel openings 11*l*1 can be provided in a sufficient size. According to the configuration, the aperture ratio is less likely to be reduced.

In the common electrode 11*h*, the second opening edges 24*b* of the openings 24 do not overlap the touch lines 15 but the first opening edges 24*a* overlap the touch lines 15. According to the configuration, no gaps are present between the touch lines 15 and the first opening edges 24*a* in the plan view and thus the rays of light traveling toward the first opening edges 24*a* are blocked by the touch lines 15. Without the light blocking portion 11*l*, the leakages of light on the pixel electrode 11*g* side relative to the touch lines 15 are further less likely to occur. Therefore, the pixel openings 11*l*1 are provide in a larger size in the light blocking portion 11*l*. According to the configuration, the aperture ratio is further less likely to be reduced.

The touch lines 15 and the pixel electrodes 11*g* are disposed in the same layer. The interlayer insulating film 21 disposed between the common electrode 11*h* and the pixel electrodes 11*g* is also disposed between the common electrode 11*h* and the touch lines 15. In comparison to a configuration in which the touch lines 15 are disposed on an opposite side from the common electrode 11*h* relative to the pixel electrodes 11*g* via the second interlayer insulating film, the production cost can be reduced by the cost of the second insulating film because the second insulating film is not required.

The source lines 11*j* (the signal lines) for transmitting signals supplied to the pixel electrodes 11*g* are provided. The source lines 11*j* are disposed in the layer in which the touch lines 15 are disposed and separated from the touch lines 15. In comparison to a configuration in which the source lines are disposed to overlap the touch lines 15 on an opposite side from the common electrode 11*h* via the second insulating film, the production cost can be reduced by the cost of the second insulating film because the second insulating film is not required.

The pixel electrodes 11*g* and the source lines 11*j* are provided and the source lines 11*j* are separated from the pixel electrodes 11*g* to which the touch lines 15 are connected. According to the configuration, the touch lines 15 are disposed between the source lines 11*j* and the pixel electrodes 11*g* to which the source lines 11*j* are not connected. Because the touch lines 15 and the common electrode 11*h* are at the reference potential (the same potential), when the signals are transmitted through the source lines 11*j*, the pixel electrodes 11*g* that are not connected to the source lines 11*j* can be shielded from the electric field that may be created by source lines 111*j* with the touch lines 15. Occurrence of crosstalk can be reduced and thus a proper level of display quality can be achieved.

The array substrate 11*b* and the CF substrate 11*a* (the common substrate) are provided. The array substrate 11*b* includes at least the common electrode 11*h*, the pixel electrodes 11*g*, and the touch lines 15. The CF substrate 11*a* is disposed opposite the array substrate 11*b* with the gap. The CF substrate 11*a* includes at least the light blocking portion 11*l*. For placing the array substrate 11*b* and the CF substrate 11*a* to be opposed to each other with the gap, allowances between the substrates 11*a* and 11*b* are required in the positioning of the substrates 11*a* and 11*b*. Such allowances are added to the dimensions of the light blocking portion 11*l* for blocking leakages of light from the openings 24. Therefore, the aperture ratio may be reduced. The common electrode 11*h* and the touch lines 15 are disposed on the array substrate 11*b*, it is not necessary to consider such allowances for defining the positional relationships between the touch lines 15 and the first opening edges 24*a* or the second opening edges 24*b* of the openings 24 in the common electrode 11*h*. Although such allowances are added to the dimensions of the light blocking portion 11*l*, the pixel openings 11/1 are less likely to be reduced in size and thus the aperture ratio is less likely to be reduced.

The openings 24 in the common electrode 11*h* include the dividing openings 11*h*2 that separate the adjacent touch electrodes 14 from each other. The dividing openings 11*h*2 that separate the adjacent touch electrodes 14 from each other are disposed to overlap at least the sections of the touch lines 15 to form the openings 24. With the dividing openings 11*h*2, which are the existing structures, the parasitic capacitance between any one of the touch lines 15 and the touch electrode 14 that is not connected to the touch line 15 can be reduced.

The common electrode 11*h* includes the pixel overlapping openings 11*h*1 overlapping the pixel electrodes 11*g*. The openings 24 are aligned to the pixel overlapping openings 11*h*1 in the direction perpendicular to the arrangement direction relative to the pixel overlapping openings 11*h*1. In comparison to a configuration in which openings are not aligned to the pixel overlapping openings 11*h*1 in the direction perpendicular to the arrangement direction, the openings 24 and the pixel overlapping openings 11*h*1 can be efficiently arranged. Furthermore, the electrical resistances related to the touch electrodes 14 that are prepared by dividing the common electrode 11*h* can be reduced.

Second Embodiment

Figure 6:
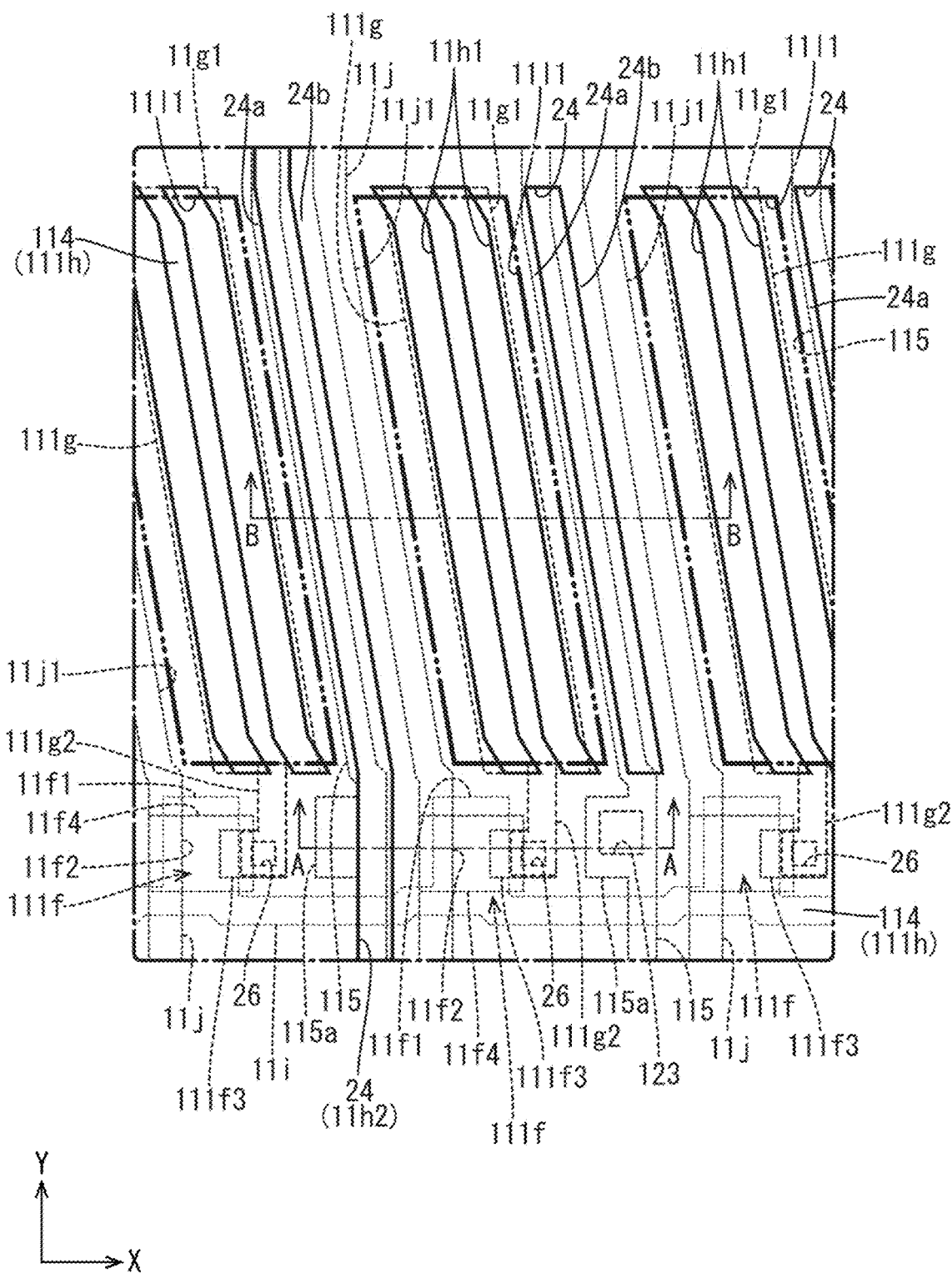
FIG. 6 is a plan view illustrating arrangement of pixels in an array substrate included in a liquid crystal panel according to a second embodiment of the present invention.

A second embodiment of the invention will be described with reference to FIGS. 6 to 8. The second embodiment further includes a second interlayer insulating film 25. Configuration, functions, and effects similar to those of the first embodiment may not be described.

Figure 7:
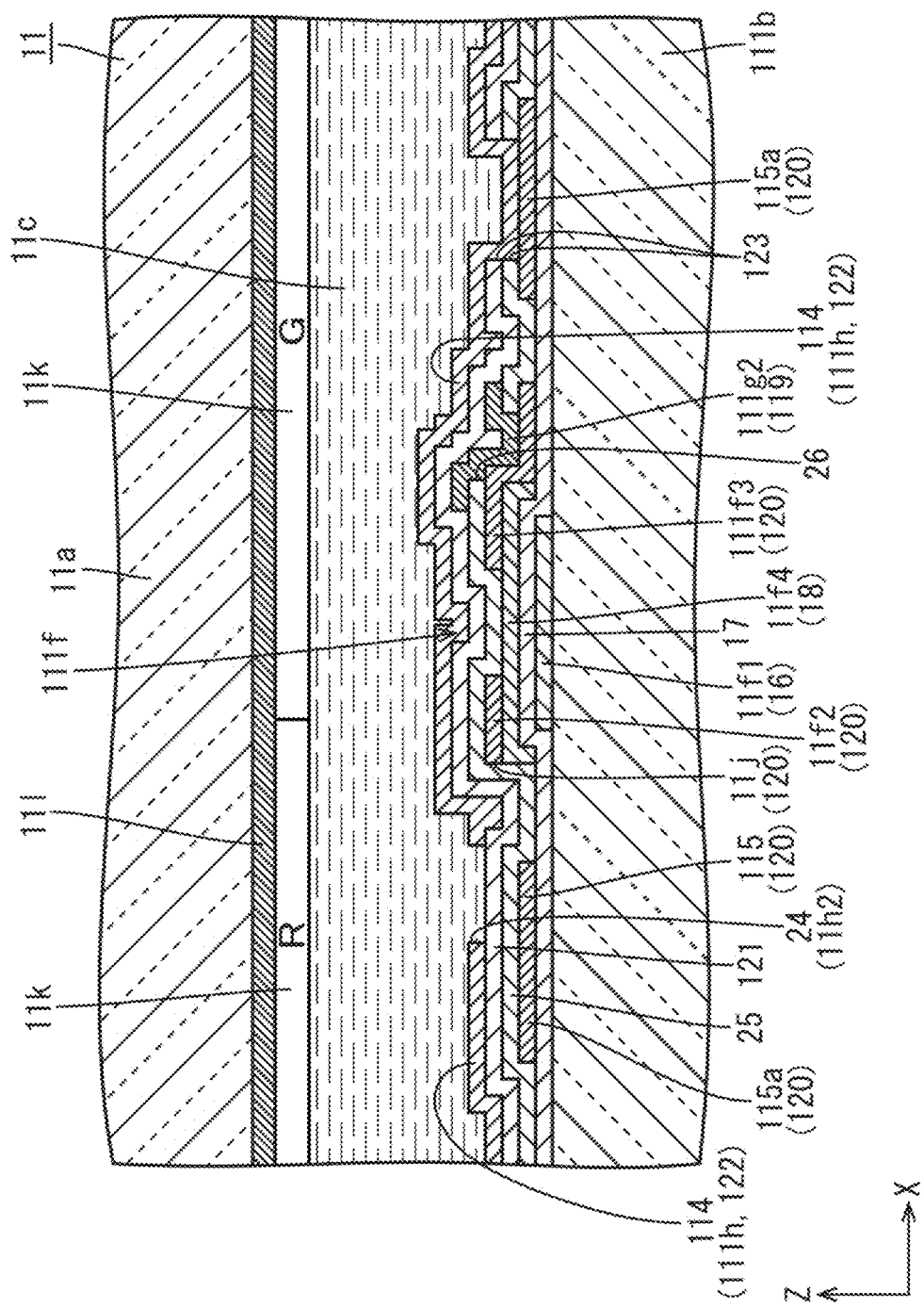
FIG. 7 is a cross-sectional view along line A-A in FIG. 6.
Figure 8:
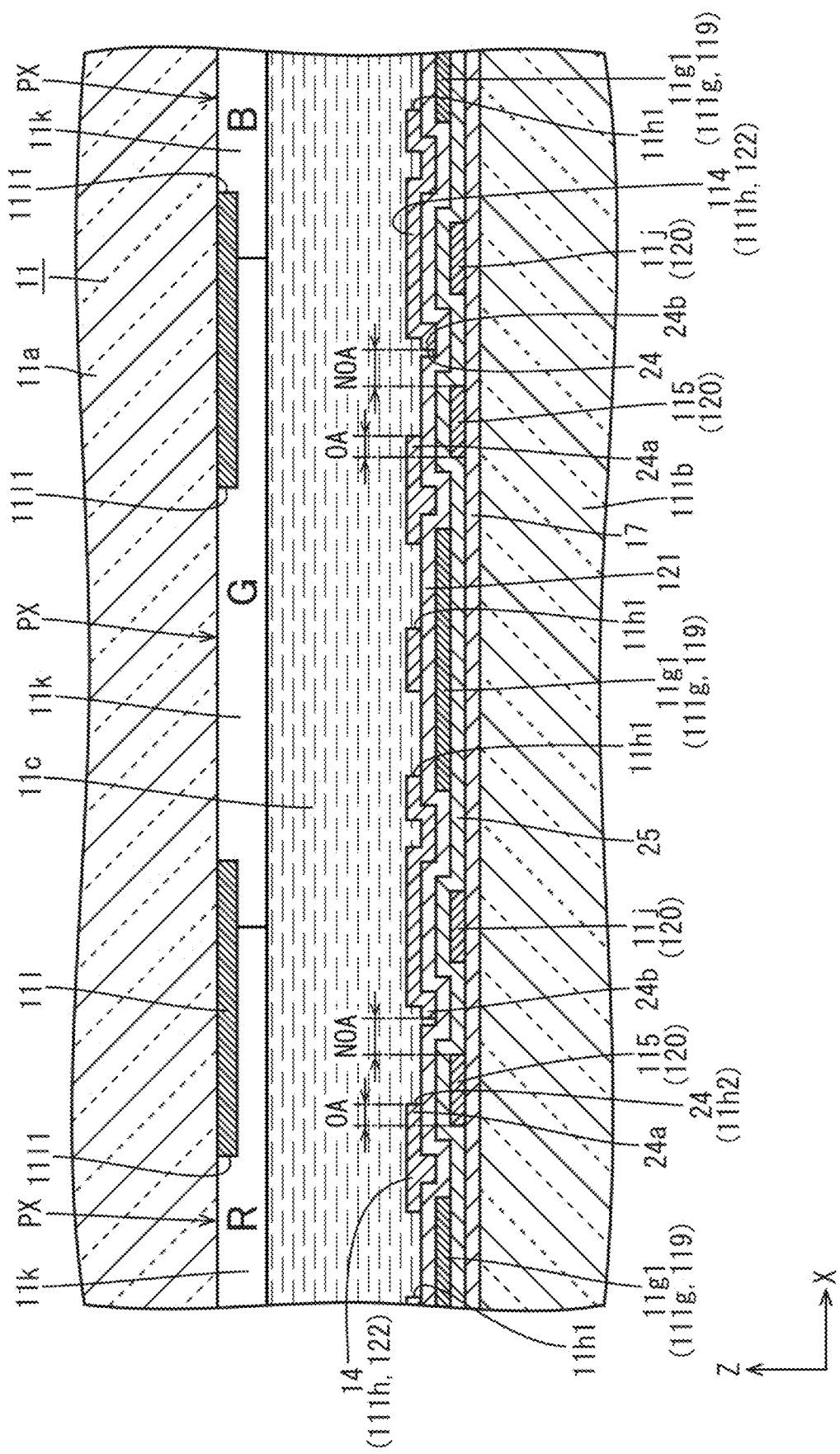
FIG. 8 is a cross-sectional view along line B-B in FIG. 6.

As illustrated in FIGS. 7 and 8, an array substrate 111*b* in this embodiment includes the second interlayer insulating film 25 (a second insulating film) disposed between a first transparent electrode film 119 and a second metal film 120. The second interlayer insulating film 25 is made of an inorganic material, similar to an interlayer insulating film 121, to insulate the first transparent electrode film 119 from the second metal film 120. The first transparent electrode film 119 is disposed in a layer upper than the second interlayer insulating film 25. The second metal film 120 is disposed in a layer lower than the second interlayer insulating film 25. In such a configuration, the interlayer insulating film 121 and the second interlayer insulating film 25 are disposed between common electrode 111*h* and touch electrodes 114 prepared from a second transparent electrode film 122 and touch lines 115 prepared from the second metal film 120. As illustrated in FIGS. 6 and 7, contact holes 123 for connecting the touch electrodes 114 to the touch lines 115 (wide portions 115*a*) are formed in the interlayer insulating film 121 and the second interlayer insulating film 25 to pass through the interlayer insulating film 121 and the second interlayer insulating film 25. According to the configuration, a distance between any one of the touch lines 115 and the touch electrode 114 that is not connected to the touch line 115 in the Z-axis direction increases by the thickness of the second interlayer insulating film 25. Therefore, a parasitic capacitance between them can be further reduced. According to the configuration, proper sensitivity can be achieved in position detection. Drain electrodes 111*f*3 of TFTs 111*f* prepared from the second metal film 120 are connected to contacts 111*g*2 of pixel electrodes 11*g* prepared from the first transparent electrode film 119 through pixel contact holes 26 in the second interlayer insulating film 25. The pixel contact holes 26 are two-dimensionally arranged at positions overlapping the drain electrodes 111*f*3 of the TFTs 111*f* and the contacts 111*g*2 of the pixel electrodes 111*g*.

According to this embodiment, as described above, the touch lines 115 are disposed on the opposite side from the common electrode 11*h* relative to the pixel electrodes 11*g* via the second interlayer insulating film 25 and selectively connected to the touch electrodes 114 through the contact holes 123 formed in the interlayer insulating film 121 and the second interlayer insulating film 25. The interlayer insulating film 121 and the second interlayer insulating film 25 are disposed between the common electrode 111*h* and the touch lines 115. A parasitic capacitance between any one of the touch lines 115 and the touch electrode 114 that is not connected to the touch line 115 can be further reduced and thus proper sensitivity can be achieved in the position detection.

Third Embodiment

A third embodiment of the invention will be described with reference to FIG. 9. The third embodiment includes touch lines 215, the number of which is different of that of the first embodiment. Configuration, functions, and effects similar to those of the first embodiment may not be described.

Figure 9:
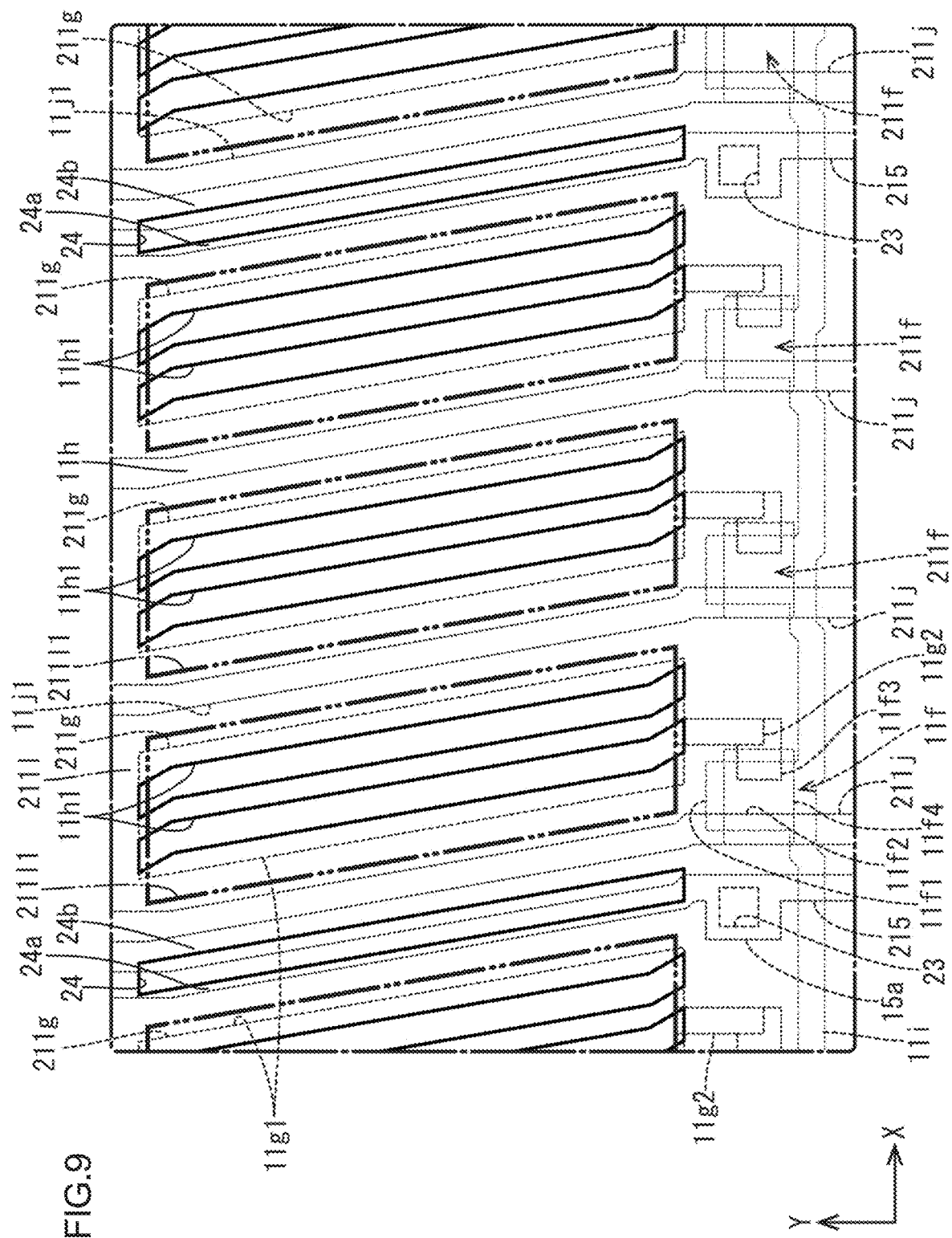
FIG. 9 is a plan view illustrating arrangement of pixels in an array substrate included in a liquid crystal panel according to a third embodiment of the present invention.

As illustrated in FIG. 9, the touch lines 215 in this embodiment are disposed such that every adjacent two of the touch lines 215 sandwich multiple (three) pixel electrodes 211g in the X-axis direction (a direction that crosses a direction in which the touch lines 215 extend, a direction in which the pixel electrodes 211g are arranged). In this embodiment, the touch lines 215 are not adjacent to the pixel electrodes 211g or source lines 211j, respectively. Each touch line 215 is adjacent to specific one of the pixel electrode 211g or specific one of the source lines 211j. Specifically, each touch line 215 is adjacent to the pixel electrode 211g opposed to a blue color filter (not illustrated in FIG. 9) and the corresponding source line 211j connected to the pixel electrode 211g via a corresponding TFT 211f. The pixel electrode 211g is opposed to a red color filter adjacent to the blue color filter. Therefore, the number of the touch lines 215 is about one third of the number of touch lines in the first embodiment. The touch lines 215 are disposed in spaces between the pixel electrodes 211g and the respective source lines 211j but may not every space between the pixel electrodes 211g and the respective source lines 211j. Therefore, the parasitic capacitances between the pixel electrodes 211g and the source lines 211j may differ from each other. The pixel electrodes 211g adjacent to the touch lines 215 that are disposed between the pixel electrodes 211g and the source lines 211j may cause display failures. Such pixel electrodes 211g are opposed to the blue color filters that have a lower level of visibility (or noticeability) in comparison to green color filters and red color filters. Therefore, even if the display failures occur, the display failures are less recognizable. Namely, the display quality is less likely to be reduced.

As illustrated in FIG. 9, a distance between the source line 211j arranged in the X-axis direction, between which the pixel electrodes 211g and the touch lines 215 are disposed, is larger than a distance between the source lines, between which the pixel electrodes 211g are disposed. Specifically, each of the pixel electrodes 211g opposed to the blue color filters is sandwiched between two source lines 211j together with the touch line 215. Each of the pixel electrodes 211g opposed to the green and the red color filters is sandwiched between two source lines 211j without the touch line 215. A distance between the source lines 211j that sandwich the pixel electrode 211g opposed to the blue color filter is larger than a distance between the source lines 211j that sandwich the pixel electrode 211g opposed to the green color filter or the red color filter by a space for the touch line 215. A width (a dimension in the X-axis direction) and an area of the pixel electrode 211g opposed to the blue color filter are about equal to a width and an area of the pixel electrode 211g opposed to the green color filter or the red color filter, respectively. Furthermore, a shape and a size of the TFT 211f connected to the pixel electrode 211g opposed to the blue color filter are about equal to the TFT 211f connected to the pixel electrode 211g opposed to the green color filter or the red color filter. A width of the pixel opening 211/1 in a light blocking portion 211l at which the blue color filter is disposed is about equal to the width of the pixel opening 211/1 at which the green color filter or the red color filter is disposed. According to the configuration, the pixel electrodes 211g have the same levels of electrical and optical performance. Therefore, a proper level of display performance can be achieved.

As described above, this embodiment includes the source lines 211j for transmitting signals supplied to the pixel electrodes 211g. The pixel electrodes 211g and the source lines 211j are arranged in the direction that crosses the direction in which the touch lines 215 extend. The touch lines 215 are disposed to sandwich the pixel electrodes 211g with respect to the direction in which the pixel electrodes 211g are arranged. The distance between the source lines 211j that sandwich the pixel electrodes 211g and the touch line 215 is larger than the distance between the source lines 211j that sandwich the pixel electrodes 211g. According to the configuration, a size of the pixel electrodes 211g sandwiched between the source lines 211j adjacent to each other in the direction in which the pixel electrodes 211g are arranged together with the touch lines 215 and a size of the pixel electrodes 211g sandwiched between the source lines adjacent to each other in the direction in which the pixel electrodes 211g are arranged without the touch lines 215 can be equalized. Therefore, the pixel electrodes 211g have the same levels of the electrical performance and the optical performance and thus a proper level of display performance can be achieved.

Fourth Embodiment

A fourth embodiment of the present invention will be described with reference to FIG. 10. The fourth embodiment includes a third metal film 27 and a second interlayer insulating film 28 in addition to the components in the first embodiment. Configuration, functions, and effects similar to those of the first embodiment may not be described.

Figure 10:
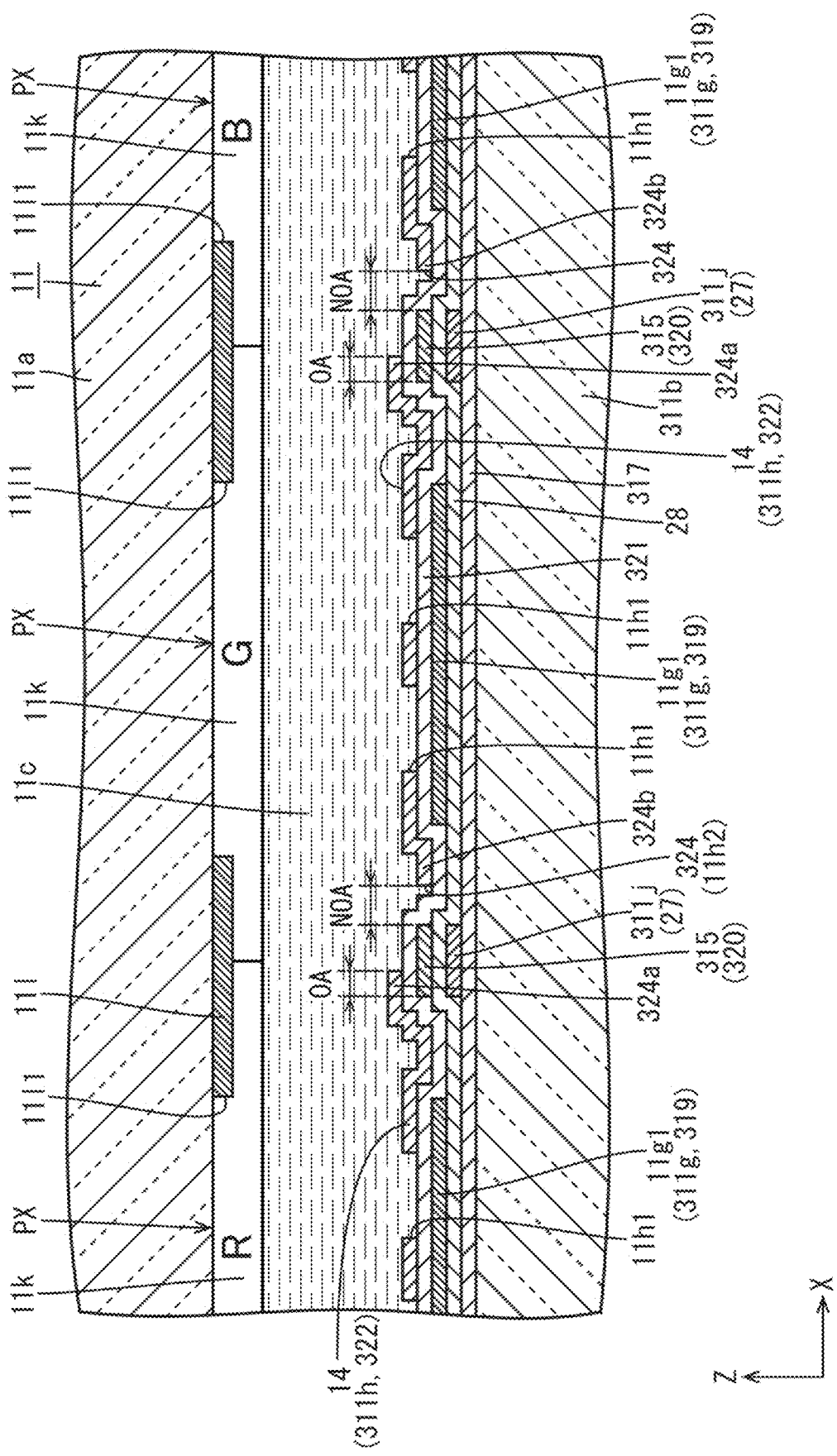
FIG. 10 is a cross-sectional view along center lines of pixels in a liquid crystal panel according to a fourth embodiment of the present invention.

As illustrated in FIG. 10, on an array substrate 311b in this embodiment, the third metal film 27 and the second interlayer insulating film 28 (the second insulating film) are disposed between a gate insulating film 317 or a semiconductor film (not illustrated in FIG. 10) and a first transparent electrode film 319. The third metal film 27 is prepared from a single-layer film made of one kind of metal, a multilayer film made of different kinds of metals, or alloy, similar to the first metal film (not illustrated in FIG. 10) and a second metal film 320. The third metal film 27 has conductivity and light blocking properties. Source lines 311j are portions of the third metal film 27. The second interlayer insulating film 28 is made of an inorganic material, similar to an interlayer insulating film 321. The second interlayer insulating film 28 insulates the third metal film 27 from the first transparent electrode film 319 and the second metal film 320. The first transparent electrode film 319 and the second metal film 320 are in the same layer upper than the second interlayer insulating film 28. Portions of the first transparent electrode film 319 are configured as pixel electrodes 311g. Portions of the second metal film 320 are configured as touch lines 315.

As illustrated in FIG. 10, the source lines 311j prepared from the third metal film 27 is disposed to overlap the touch lines 315 prepared from the second metal film 320 in a plan view. The second interlayer insulating film 28 is disposed between the source lines 311j and the touch lines 315. The source lines 311j and the touch lines 315 overlap each other for about entire widths. In comparison to the first embodiment in which the source lines 11j and the touch lines 15 are disposed in the same layer and the source lines 11j are separated from the touch lines 15 in the X-axis direction (see FIG. 4), the source lines 311j and the touch lines 315 are further efficiently arranged and thus the aperture ratio is further less likely to be reduced. The source lines 311j are disposed behind (on an opposite side from a common electrode 311h relative to) the touch lines 315 and the pixel electrodes 311g disposed in the same layer via the second interlayer insulating film 28. When signals are transmitted through the source lines 311j, electric fields may be created between the source lines 311j and opening edges 324a, 324b of openings 324 in the common electrode 311h. The electric fields may induce leakages of light around the openings 324. Because the interlayer insulating film 321 and the second interlayer insulating film 28 are disposed between the source lines 311j and the common electrode 311, the strengths of the electric fields between the source lines 311j and the common electrode 311h is reduced. The source lines 311j are disposed behind the touch lines 315 and the pixel electrodes 311g via the second interlayer insulating film 28. The common electrode 311h is prepared from a second transparent electrode film 322. According to the configuration, the leakages of light are less likely to be caused by the source lines 311j around the openings 324.

As described above, this embodiment includes the source lines 311j for transmitting the signals supplied to the pixel electrodes 311g. The source lines 311j are disposed to overlap the touch lines 315 via the second interlayer insulating film 28. In comparison to the configuration in which the source lines and the touch lines 315 are disposed in the same layer and the source lines are separated from the touch lines 315, the source lines 311j and the touch lines 315 are further efficiently arranged and thus the aperture ratio is further less likely to be reduced.

The touch lines 315 and the pixel electrodes 311g are disposed in the same layer. The source lines 311j are disposed on the opposite side from the common electrode 311h relative to the touch lines 315 and the pixel electrodes 311g via the second interlayer insulating film 28. When the signals are transmitted through the source lines 311j, the electric fields are created between the source lines 311j and the opening edges of the openings 324 in the common electrode 311h. The electric fields may induce leakages of light around the openings 324. Because the interlayer insulating film 321 and the second interlayer insulating film 28 are disposed between the common electrode 311h and the source lines 311j, the strengths of the electric fields between the source lines 311j and the common electrode 311h is reduced. Therefore, the leakages of light are less likely to be caused by the source lines 311j.

Fifth Embodiment

A fifth embodiment of the present invention will be described with reference to FIG. 11. The fifth embodiment includes openings 424 and touch lines 415 having positional relationships different from those in the first embodiment. Configuration, functions, and effects similar to those of the first embodiment may not be described.

Figure 11:
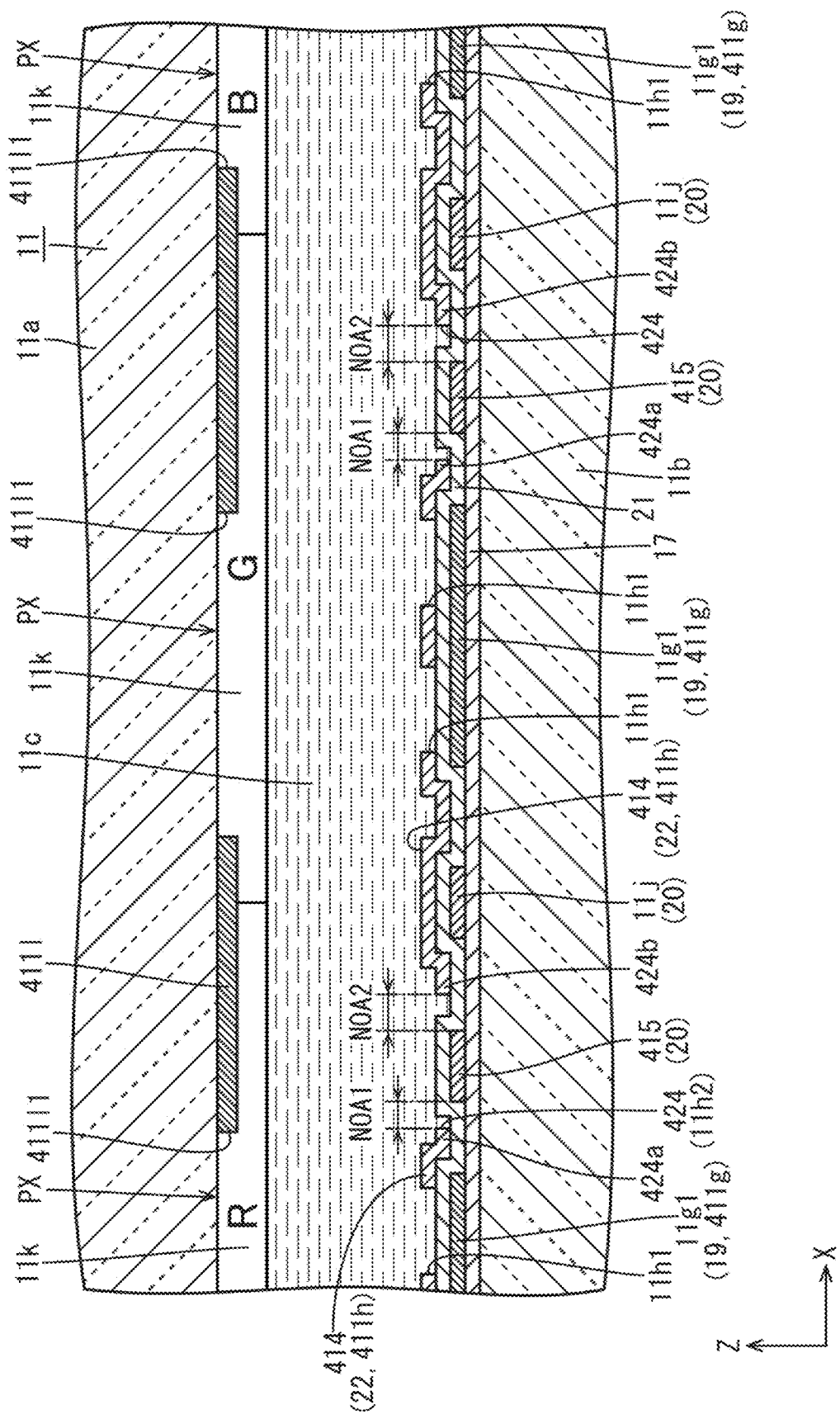
FIG. 11 is a cross-sectional view along center lines of pixels in a liquid crystal panel according to a fifth embodiment of the present invention.

As illustrated in FIG. 11, a common electrode 411h in this embodiment includes openings 424 including first opening edges 424a and second opening edges 424b disposed not to overlap touch lines 415. According to the configuration, a parasitic capacitance between any one of the touch lines 415 and a touch electrode 414 that is not connected to the touch line 415 is properly reduced. Therefore, further proper sensitivity can be achieved in position detection. A non-overlapping area NOA1 (a gap) between the first opening edge 424a of any one of the openings 424 and the corresponding touch line 415 is smaller than a non-overlapping area NOA2 between the second opening edge 424b of any one of the openings 424 and the corresponding touch line 415. Namely, gaps are provided between the first opening edge 424a of the opening 424 and the touch line 415 and between the second opening edge 424b of the opening 424 and the touch line 415; however, the gap between the first opening edge 424a and the touch line 415 is smaller than the gap between the second opening edge 424b and the touch line 415. Therefore, leakages of light are less likely occur on a pixel electrode 411g side relative to the touch lines 415. Pixel openings 411l/1 can be formed in sufficiently large size in a light blocking portion 411l. Therefore, the aperture ratio of the pixels PX is less likely to be reduced.

As described above, in this embodiment, the first opening edges 424a and the second opening edges 424b of the openings 424 in the common electrode 411h do not overlap the touch lines 415. The non-overlapping area between the first opening edge 424a and the touch line 415 is smaller than the non-overlapping area between the second opening edge 424b and the touch line 415. According to the configuration, the parasitic capacitance between the touch line 415 and the touch electrode 414 that is not connected to the touch line 415 is reduced. Therefore, further proper sensitivity can be achieved in the position detection. Even if a gap is provided between the first opening edge 424a of the opening 424 in the common electrode 411h and the touch line 415 in a plan view, the gap is smaller than a gap between the second opening edge 424b of the opening 424 and the touch line 415. Therefore, leakages of light on the pixel electrode 411g side relative to the touch lines 415 are less likely to occur.

Sixth Embodiment

A sixth embodiment of the present invention will be described with reference to FIG. 12. The sixth embodiment includes openings 524 and touch lines 515 having positional relationships that are different from those in the fifth embodiment. Configuration, functions, and effects similar to those of the fifth embodiment may not be described.

As illustrated in FIG. 12, in this embodiment, first opening edges 524a and second opening edges 524b of the openings 524 in a common electrode 511h are disposed not to overlap touch lines 515. Furthermore, the first opening edges 524a are flush with ends of the touch lines 515 on a pixel electrode 511g side. Non-overlapping areas do not exist between the first opening edges 524a of the openings 524 and the touch lines 515. Non-overlapping areas NOA2 are provided between the second opening edges 524b and the touch lines 515. Similar to the fifth embodiment, proper sensitivity can be achieved in the position detection. Furthermore, the gaps are less likely to be present between the first opening edges 524a of the openings 524 in the common electrode 511h and the touch lines 515 in the plan view. Therefore, reliability in reduction of leakages of light on the pixel electrode 511g side relative to the touch lines 515 is sufficiently improved without a light blocking portion 511l. According to the configuration, pixel openings 511l/1 are provided in sufficient size in the light blocking portion 511l while the proper sensitivity is maintained in the position detection. Furthermore, the aperture ratio is less likely to be reduced.

As described above, in this embodiment, the first opening edges 524a of the openings 524 in the common electrode 511h are flush with the ends of the touch lines 515 on the pixel electrode 511g side. According to the configuration, the parasitic capacitance between the touch line 515 and a touch electrode 514 that is not connected to the touch line 515 can be properly reduced. Furthermore, gaps are less likely to be provided between the first opening edges 524a of the openings 524 in the common electrode 511h and the touch lines 515 in the plan view. Without the light blocking portion 511*l*, reliability in reduction of the leakages of light improves on the pixel electrode 511*g* side relative to the touch lines 515. According to the configuration, the pixel openings 511/1 are provided in sufficient size in the light blocking portion 511*l* while the proper sensitivity is maintained in the position detection. Furthermore, the aperture ratio is less likely to be reduced.

Seventh Embodiment

A seventh embodiment of the present invention will be described with reference to FIG. 13. The seventh embodiment includes source lines 611*j* and touch lines 615 having configurations different from those in the first embodiment. Configuration, functions, and effects similar to those of the first embodiment may not be described.

As illustrated in FIG. 13, the source lines 611*j* and the touch lines 615 in this embodiment are prepared from a first transparent electrode film 619 and a second metal film 620 that are laminated. According to the configuration, pixel electrodes 611*g*, the source lines 611*j*, and the touch lines 615 are prepared through patterning with a single photomask in a production of an array substrate 611*b*. Because the source lines 611*j* and the touch lines 615 are prepared from the first transparent electrode film 619 and the second metal film 620 that are laminated, resistances of lines can be reduced. Furthermore, the source lines 611*j* and the touch lines 615 have redundancy. Therefore, the lines are less likely to be disconnected. To form the pixel electrodes 611*g*, the source lines 611*j*, and the touch lines 615 through patterning, the first transparent electrode film 619 and the second metal film 620 are consecutively formed, the photoresist is formed, and then exposure is performed using a halftone mask, which is not illustrated. The halftone mask includes transmissive areas, semi-transmissive areas, and light blocking areas. The transmissive areas pass exposure light applied by an exposure device with a transmission rate of about 100%. The semi-transmissive areas pass the exposure light with a transmission rate of about 10% to 70%. The light blocking areas block the exposure light. The transmissive areas or the light blocking areas are disposed to overlap areas in which the source lines 611*j* and the touch lines 615 are formed in a plan view. The semi-transmissive areas are disposed to overlap areas in which the pixel electrodes 611*g* are formed in the plan view. After the exposure using the halftone mask, etching is performed. Remaining sections of the first transparent electrode film 619 and the second metal film 620 are defined as the source lines 611*j* and the touch lines 615. Remaining sections of the first transparent electrode film 619 without the second metal film 620 are defined as the pixel electrodes 611*g*. Because the pixel electrodes 611*g*, the source lines 611*j*, and the touch lines 615 can be prepared through the patterning using the single photomask, this configuration is preferable for reducing the production cost.

Other Embodiments

The present invention is not limited to the embodiments described above and illustrated by the drawings. For example, the following embodiments will be included in the technical scope of the present invention.

(1) The openings in the common electrodes, the overlapping areas that overlap the touch lines, and the non-overlapping areas that do not overlap the touch lines may be altered from those in the above embodiments where appropriate.

(2) In each of the above embodiments, the diving openings in the common electrode are arranged to overlap the touch lines. However, the diving openings may be arranged not to overlap the touch lines.

(3) In each of the above embodiments (except for the second embodiment), the first transparent electrode film and the second metal film are disposed in the upper layer and the lower layer, respectively. However, the first transparent electrode film and the second metal film may be disposed in the lower layer and the upper layer, respectively.

(4) In each of the above embodiments (except for the fourth embodiment), each of the relevant source lines is closer to the pixel electrode to be connected relative to the corresponding touch line and separated from the corresponding touch line. However, the source line may be disposed closer to the pixel electrode not to be connected relative to the corresponding touch line and separated from the corresponding touch line.

(5) In the third embodiment, three pixel electrodes are sandwiched between the touch lines. However, two pixel electrodes or four or more pixel electrodes may be sandwiched between the touch lines.

(6) In the third embodiment, the touch lines are disposed adjacent to the pixel electrodes that are opposed to the blue color filters. However, the touch lines may be disposed adjacent to the pixel electrodes that are opposed to the green color filters or the red color filters.

(7) In the fourth embodiment, the source lines and the touch lines are disposed in the lower layer and the upper layer relative to the second interlayer insulating film, respectively. However, the source lines and the touch lines may be disposed in the upper layer and the lower layer, respectively.

(8) In the fourth embodiment, the source lines and the touch lines overlap each other for the substantially entire width. However, the source lines and the touch lines may partially overlap each other in the width direction.

(9) The technical matters in the above embodiments may be combined where appropriate.

(10) In the second embodiment, the pixel electrodes are prepared from the first transparent electrode film disposed in the lower layer and the common electrode is prepared from the second transparent electrode film disposed in the upper layer. However, the common electrode may be prepared from the first transparent electrode film and the pixel electrodes may be prepared from the second transparent electrode film.

(11) In the second embodiment, the common electrode includes the pixel overlapping openings for the alignment of the liquid crystal molecules in the liquid crystal layer. However, the pixel electrodes may include openings for the alignment of the liquid crystal molecules in the liquid crystal layer.

(12) In each of the above embodiments, the source lines include the diagonally extending portions. However, the source lines may include only linear portions that extend in the Y-axis direction without the diagonally extending portions.

(13) In each of the above embodiments, the light blocking portion is disposed on the CF substrate. However, the light blocking portion may be disposed on the array substrate.

(14) The semiconductor film that includes the portions configured as the channels of the TFTs may be made of polysilicon. In such a configuration, it is preferable that the TFTs have a bottom-gate configuration.

(15) In each of the above embodiments, the touch panel pattern uses the self-capacitance method. However, a touch screen pattern that uses a mutual-capacitance method may be used.

(16) The transmissive liquid crystal panel is described in each of the above embodiment sections. However, the technology described herein may be applied to reflective liquid crystal panels and semitransmissive liquid crystal panels.

(17) The liquid crystal display device (the liquid crystal panel or the backlight unit) having the horizontally-long rectangular shape in the plan view is described in each of the above embodiment sections. However, the technology described herein may be applied to liquid crystal display devices having vertically-long rectangular shapes, square shapes, circular shapes, semicircular shapes, oval shapes, and trapezoidal shapes.

(18) The liquid crystal panel including the liquid crystal layer sandwiched between the substrates is described in each of the above embodiment sections. However, the technology described herein may be applied to display panels each including functional organic molecules other than the liquid crystals sandwiched between the substrates.

EXPLANATION OF SYMBOLS

10: Liquid crystal display device (Display device with position input function), 11a: CF substrate (Common substrate), 11b, 111b, 311b, 611b: Array substrate, 11g, 111g, 211g, 311g, 411g, 511g, 611g: Pixel electrode, 11h, 111h, 311h, 411h, 511h: Common electrode, 11h1: Pixel overlapping opening, 11h2: Dividing opening, 11j, 211j, 311j, 611j: Source line (Signal line), 11l, 211l, 411l, 511l: Light blocking portion, 11/1, 211/1, 411/1, 511/1: Pixel opening, 14, 114, 414, 514: Touch electrode (Position detection electrode), 15, 115, 215, 315, 415, 515, 615: Touch lines (Position detection lines), 21, 121, 321: Interlayer insulating film (Insulating film), 23, 123: Contact opening, 24, 324, 424, 524: Hole, 24a, 324a, 424a, 524a: First opening edge, 24b, 324b, 424b, 524b: Second opening edge, 25: Second interlayer insulating film (Second insulating film), 28: Second interlayer insulating film (Second insulating film), NOA1, NOA2: Non-overlapping area

The invention claimed is:

1. A display device with a position input function comprising:
    at least one pixel electrode;
    a common electrode disposed to at least partially overlap the at least one pixel electrode via an insulating film;
    position detection electrodes prepared by dividing the common electrode and configured so that a position input member for position input operation and corresponding one of the position detection electrodes form a capacitor to detect a position of input by the position input member;
    position detection lines disposed not to overlap the at least one pixel electrode such that at least the insulating film is disposed between the common electrode and the position detection lines and selectively connected to the position detection electrodes via contact holes formed at least in the insulating film; and
    a light blocking portion disposed to overlap at least a section of the at least one pixel electrode and including a pixel opening, the light blocking portion blocking light, wherein
    the common electrode includes openings overlapping at least sections of the position detection lines and including opening edges,
    the opening edges include first opening edges located closer to the at least one pixel electrode relative to the position detection lines and second opening edges located on an opposite side from the at least one pixel electrode relative to the position detection lines, and
    the first opening edges are closer to the position detection lines in comparison to the second opening edges,
    the second opening edges of the openings in the common electrode do not overlap the position detection lines and the first opening edges overlap sections of the position detection lines.

2. The display device with the position input function according to claim 1, wherein the position detection lines and the at least one pixel electrode are disposed in the same layer.

3. The display device with the position input function according to claim 1, wherein the position detection lines are disposed on an opposite side from the common electrode relative to the at least one pixel electrode via a second insulating film and selectively connected to the position detection lines via the contact holes in the insulating film and the second insulating film.

4. The display device with the position input function according to claim 1, further comprising at least one signal line for transmitting a signal supplied to the at least one pixel electrode, the at least one signal line being disposed in the layer in which the position detection lines are disposed and separated from the position detection lines.

5. The display device with the position input function according to claim 4, wherein
    the least one pixel electrode includes pixel electrodes and the at least one signal line includes signal lines, and
    any one of the signal lines is separated from corresponding one of the position detection lines closer to corresponding one of the pixel electrodes to which the any one of the signal lines is connected.

6. The display device with the position input function according to claim 1, further comprising:
    an array substrate including the at least the common electrode, the at least one pixel electrode, and the position detection lines; and
    a common substrate opposed to the array substrate with a gap and including at least a light blocking portion.

7. The display device with the position input function according to claim 1, wherein the openings in the common electrode include dividing openings separating the position detection electrodes from one another.

8. The display device with the position input function according to claim 1, wherein
    the common electrode includes a pixel overlapping opening at a position overlapping the at least one pixel electrode, and
    the openings are aligned to the pixel overlapping opening in a direction perpendicular to a direction in which the openings are arranged relative to the pixel overlapping opening.

9. The display device with the position input function according to claim 1, further comprising at least one signal line for transmitting a signal supplied to the at least one pixel electrode, wherein
    the at least one pixel electrode includes pixel electrodes and the at least one signal line includes signal lines, the pixel electrodes and the signal lines are disposed in a direction that crosses a direction in which the position detection lines extend, the position detection lines are disposed to sandwich the pixel electrodes in a direction in which the pixel electrodes are arranged, and the signal lines are disposed such that a distance between the signal lines sandwiching corresponding one of the pixel electrodes and corresponding one of the position detection lines is larger than a distance between the signal lines sandwiching corresponding one of the pixel electrodes.

10. A display device with a position input function comprising:

at least one pixel electrode;

a common electrode disposed to at least partially overlap the at least one pixel electrode via an insulating film;

position detection electrodes prepared by dividing the common electrode and configured so that a position input member for position input operation and corresponding one of the position detection electrodes form a capacitor to detect a position of input by the position input member;

position detection lines disposed not to overlap the at least one pixel electrode such that at least the insulating film is disposed between the common electrode and the position detection lines and selectively connected to the position detection electrodes via contact holes formed at least in the insulating film; and a light blocking portion disposed to overlap at least a section of the at least one pixel electrode and including a pixel opening, the light blocking portion blocking light, wherein the common electrode includes openings overlapping at least sections of the position detection lines and including opening edges, the opening edges include first opening edges located closer to the at least one pixel electrode relative to the position detection lines and second opening edges located on an opposite side from the at least one pixel electrode relative to the position detection lines, and the first opening edges are closer to the position detection lines in comparison to the second opening edges, the first opening edges and the second opening edges of the openings in the common electrode do not overlap the position detection lines, and non-overlapping areas between the first opening edges and the position detection lines are smaller than non-overlapping areas between the second opening edges and the position detection lines.

11. The display device with the position input function according to claim 10, wherein the first opening edges of the openings in the common electrode are flush with ends of the position detection lines on a pixel electrode side.

12. The display device with the position input function according to claim 10, wherein the position detection lines and the at least one pixel electrode are disposed in the same layer.

13. The display device with the position input function according to claim 10, wherein the position detection lines are disposed on an opposite side from the common electrode relative to the at least one pixel electrode via a second insulating film and selectively connected to the position detection lines via the contact holes in the insulating film and the second insulating film.

14. The display device with the position input function according to claim 10, further comprising at least one signal line for transmitting a signal supplied to the at least one pixel electrode, the at least one signal line being disposed in the layer in which the position detection lines are disposed and separated from the position detection lines.

15. The display device with the position input function according to claim 14, wherein the least one pixel electrode includes pixel electrodes and the at least one signal line includes signal lines, and any one of the signal lines is separated from corresponding one of the position detection lines closer to corresponding one of the pixel electrodes to which the any one of the signal lines is connected.

16. A display device with a position input function comprising:

at least one pixel electrode;

a common electrode disposed to at least partially overlap the at least one pixel electrode via an insulating film;

position detection electrodes prepared b dividing the common electrode and configured so that a position input member for position input operation and corresponding one of the position detection electrodes form a capacitor to detect a position of input by the position input member;

position detection lines disposed not to overlap the at least one pixel electrode such that at least the insulating film is disposed between the common electrode and the position detection lines and selectively connected to the position detection electrodes via contact holes formed at least in the insulating film; and a light blocking portion disposed to overlap at least a section of the at least one pixel electrode and including a pixel opening, the light blocking portion blocking light, wherein the common electrode includes openings overlapping at least sections of the position detection lines and including opening edges, the opening edges include first opening edges located closer to the at least one pixel electrode relative to the position detection lines and second opening edges located on an opposite side from the at least one pixel electrode relative to the position detection lines, and the first opening edges are closer to the position detection lines in comparison to the second opening edges, the display device with the position input function further comprises at least one signal line for transmitting a signal supplied to the at least one pixel electrode, the at least one signal line being disposed to overlap the position detection lines via a second insulating film.

17. The display device with the position input function according to claim 16, wherein the position detection lines and the at least one pixel electrode are disposed in the same layer, and the at least one signal line is disposed on an opposite side from the common electrode relative to the position detection lines and the at least one pixel electrode via the second insulating film.

18. The display device with the position input function according to claim 16, wherein the position detection lines and the at least one pixel electrode are disposed in the same layer.

19. The display device with the position input function according to claim 16, wherein the position detection lines are disposed on an opposite side from the common electrode relative to the at least one pixel electrode via a second insulating film and selectively connected to the position detection lines via the contact holes in the insulating film and the second insulating film.

* * * * *